(12) United States Patent
Eller et al.

(10) Patent No.: US 12,064,052 B2
(45) Date of Patent: Aug. 20, 2024

(54) BEVERAGE MACHINE USING PODS THAT CONTAIN WHOLE BREWING ELEMENTS

(71) Applicant: Smart Coffee Technology, Palo Alto, CA (US)

(72) Inventors: Adam Teddy Eller, East Palo Alto, CA (US); Erik Charles Pfleiderer, Palo Alto, CA (US); Chad Burnham Ingerick, Palo Alto, CA (US)

(73) Assignee: SMART COFFEE TECHNOLOGY, Palo Alto, CA (US)

( * ) Notice: Subject to any disclaimer, the term of this patent is extended or adjusted under 35 U.S.C. 154(b) by 0 days.

(21) Appl. No.: 18/081,645

(22) Filed: Dec. 14, 2022

(65) Prior Publication Data

US 2023/0190032 A1  Jun. 22, 2023

Related U.S. Application Data

(63) Continuation of application No. 16/747,338, filed on Jan. 20, 2020, now Pat. No. 11,534,019, which is a (Continued)

(51) Int. Cl.
*A47J 31/40* (2006.01)
*A47J 31/42* (2006.01)
*A47J 31/44* (2006.01)

(52) U.S. Cl.
CPC .......... *A47J 31/407* (2013.01); *A47J 31/42* (2013.01); *A47J 31/4492* (2013.01)

(58) Field of Classification Search
CPC ....... A47J 31/407; A47J 31/42; A47J 31/4492
See application file for complete search history.

(56) References Cited

U.S. PATENT DOCUMENTS 3,278,068 A   10/1966   Hutcheon
3,873,018 A   3/1975   Donnay
(Continued)

FOREIGN PATENT DOCUMENTS

CN  202848346 U  4/2013
GB  2008394 A  6/1979
(Continued)

OTHER PUBLICATIONS

European Patent Office, Extended European Search Report and Opinion, EP Patent Application No. 21172780.5, Aug. 13, 2021, 18 pages.
(Continued)

*Primary Examiner* — Thien S Tran
(74) *Attorney, Agent, or Firm* — FENWICK & WEST LLP

(57) ABSTRACT

A beverage machine that brews beverages from a beverage pod is described. The pod is container with a top surface and a bottom surface connected by a sidewall that form a cylinder. The pod contains whole brewing elements that can be ground into sub-elements by the brewing system for brewing into a beverage. The pod is actuatable between an open state and a closed state by a breaking system of the beverage machine. In the closed state the brewing elements are contained and in the open state the elements are released. The pod includes a failure mechanism on the sidewall that is engineered to fail when the pod is actuated by a breaking mechanism of the beverage machine. When actuated the failure mechanism fails such that the beverage pod can be pulled into a top portion and a bottom portion to release the brewing elements.

22 Claims, 32 Drawing Sheets

Related U.S. Application Data continuation of application No. 15/970,839, filed on May 3, 2018, now Pat. No. 10,537,202.

(60) Provisional application No. 62/500,734, filed on May 3, 2017.

(56) References Cited

U.S. PATENT DOCUMENTS

| | | |
|---|---|---|
| 4,076,848 A | 2/1978 | de Limur |
| 5,463,934 A | 11/1995 | Locati |
| 5,906,845 A | 5/1999 | Robertson |
| 2002/0048621 A1 | 4/2002 | Boyd et al. |
| 2003/0010787 A1 | 1/2003 | Dalton et al. |
| 2003/0047937 A1 | 3/2003 | Chaduc et al. |
| 2008/0210686 A1 | 9/2008 | Shapiro et al. |
| 2012/0121780 A1 | 5/2012 | Lai et al. |
| 2012/0266755 A1* | 10/2012 | Baudet ............... A47J 31/3633 99/295 |
| 2013/0129870 A1 | 5/2013 | Novak et al. |
| 2015/0050393 A1 | 2/2015 | Chen |
| 2015/0079240 A1 | 3/2015 | Lo Foro et al. |
| 2016/0068334 A1 | 3/2016 | Cafaro et al. |
| 2016/0192806 A1 | 7/2016 | Pikkemaat et al. |
| 2016/0242594 A1 | 8/2016 | Empl et al. |
| 2017/0071398 A1* | 3/2017 | Laner ..................... A47J 31/42 |
| 2018/0000108 A1* | 1/2018 | Boggavarapu ...... A47J 31/5251 |

FOREIGN PATENT DOCUMENTS

| | | | |
|---|---|---|---|
| WO | WO 2015/022209 A1 | 2/2015 | |
| WO | WO 2015/055849 A1 | 4/2015 | |
| WO | WO 2015/169398 A1 | 11/2015 | |
| WO | WO-2015169398 A1 * | 11/2015 | ......... A47J 31/3614 |

OTHER PUBLICATIONS

European Patent Office, Extended European Search Report and Opinion, EP Patent Application No. 18794681.9, Feb. 8, 2021, 13 pages.

PCT International Search Report and Written Opinion, PCT Application No. PCT/US2018/030997, Jul. 12, 2018, 16 pages.

United States Office Action, U.S. Appl. No. 15/970,839, filed Mar. 25, 2019, 26 pages.

United States Office Action, U.S. Appl. No. 16/747,338, filed Jan. 18, 2022, 14 pages.

* cited by examiner

BEVERAGE MACHINE USING PODS THAT CONTAIN WHOLE BREWING ELEMENTS

CROSS-REFERENCE To RELATED APPLICATION

This application is a continuation of U.S. application Ser. No. 16/747,338 filed Jan. 20, 2020 which is a continuation of U.S. application Ser. No. 15/970,839 filed May 3, 2018, now U.S. Pat. No. 10,537,202, which claims the benefit of U.S. Provisional Application No. 62/500,734 filed May 3, 2017, the contents of both of which are hereby incorporated in reference in their entirety.

BACKGROUND

The present invention relates to an apparatus for making beverages such as coffee or tea through the use of a single pod that contains whole beans or leaves.

There are many types of counter-top beverage machines that can brew a beverage. In general there are two styles of beverage machines: soluble container machines and hopper machines. Both systems have various advantages and disadvantages.

Soluble container beverage machines are economical and have a small counter-top footprint. Further, soluble container machines allow a wide range of single-service beverages to be produced by the machine. A user inserts a container including a soluble substance into the machine and the machine brews a beverage using the soluble substance. However, because the soluble substances are pre-packaged, these machines do not allow for "freshly ground" beverages to be brewed.

Hopper machines have a larger footprint and are more expensive. However, hopper machines allow a user to produce a beverage using a freshly ground substance. Hopper machines include a hopper that can be filled with a substance that can be freshly ground and brewed into a beverage. However, do to the nature of the brewing process in hopper machines, they only allow for a user to brew a beverage using whatever substance is in the hopper. There are usually only a few different beverage options in a hopper machine.

SUMMARY

Described is a beverage machine with a small footprint that allows a user to brew a beverage using a freshly ground substance. The beverage machine uses a beverage pod that contains whole brew elements which are ground into sub-elements internal to the beverage machine. The sub-elements are brewed into a beverage using a brewing system internal to the beverage machine. A beverage pod can include any type of whole brew elements and, therefore, the beverage machine can create a wide variety of beverages.

The beverage pod is container with a top surface and a bottom surface connected by a sidewall that form a cylinder. The pod contains whole brewing elements that can be ground into sub-elements by the brewing system for brewing into a beverage. The pod is actuatable between an open state and a closed state by a breaking system of the beverage machine. In the closed state the brewing elements are contained and in the open state the elements are released. The pod includes a failure mechanism on the sidewall that is engineered to fail when the pod is actuated by a breaking mechanism of the beverage machine. When actuated the failure mechanism fails such that the beverage pod can be pulled into a top portion and a bottom portion to release the brewing elements. A machine readable indicator describing the contents of the pod and a brewing process for those contents is affixed to an outer surface of the pod.

To brew a beverage with the pod, a user inserts the pod into the beverage machine. The beverage machine reads the machine readable indicator and determines a brew process for the beverage. The pod is broken by a breaker of the beverage machine. The breaker actuates the pod from the closed state to the open state to release the whole elements it contains into the beverage machine. The whole elements travel down a hopper and into a grinder. The grinder grinds the whole elements into sub-elements according to the brew process. The sub-elements are deposited onto a wiper apparatus below the grinder after they are ground. The wiper apparatus moves the sub-elements into a brewer. The brewer brews the sub-elements into a beverage using a liquid pumped into the brewer with a fluidic system internal to the beverage machine. The beverage machine pumps the beverage out of the machine and into an external container. The beverage machine pumps the elements according to the brew process using a fluidic system internal to the beverage machine.

After brewing the beverage, the beverage machine returns to a state in which it is ready to brew another beverage with a different beverage pod. Because the beverage machine can use pods a variety of whole elements, the beverage machine can produce an assortment of beverages.

DETAILED DESCRIPTION

I. Machine

A beverage machine takes beverage pods containing whole elements (e.g., tea leaves, or coffee beans) as an input. The beverage machine breaks the beverage pod 102 such that the whole elements are released into the beverage machine. The pod includes a machine readable code that be scanned by the machine to obtain information about that pod's whole elements or a brewing process for the pod's whole elements.

The readable code may comprise any type of machine readable code, such as a barcode, a QR code, text, datamatrix codes, a picture, a symbol, or any other scannable data element. When the beverage pod is input into the beverage machine, the code is scanned and the determined information is used to configure components of the beverage machine and process of the beverage machine. In one configuration, the barcode can include a unique ID linked to information stored within the beverage machine or available via a network. For example the scanned barcode is the unique ID "Colombia Roast." Using the scanned unique ID, the beverage machine can access information associated with unique ID for brewing the beverage. The unique ID is used to uniquely identify any element (or combination of elements) associated with the pod including: the type of elements contained in the pod, brewing instructions, age of the pod, origin of the pod, the pod itself, rating of the pod, or any other information associated with the pod. Additionally, the unique ID can be associated with information about the brewing process. For example the information can include: water temperature, grinding size, brewing time, water amount, or any other information used in the beverage making process. In some cases, rather than accessing a unique ID, information about the elements or the brewing process are encoded in the machine readable code itself Components of the beverage machine grind the elements into sub-elements (e.g. coffee grounds or diced tea leaves) and uses those sub elements to brew a beverage in an internal brew chamber. The beverage machine dispenses the beverage out of a beverage spout into a user provided cup.

Figure 1A:
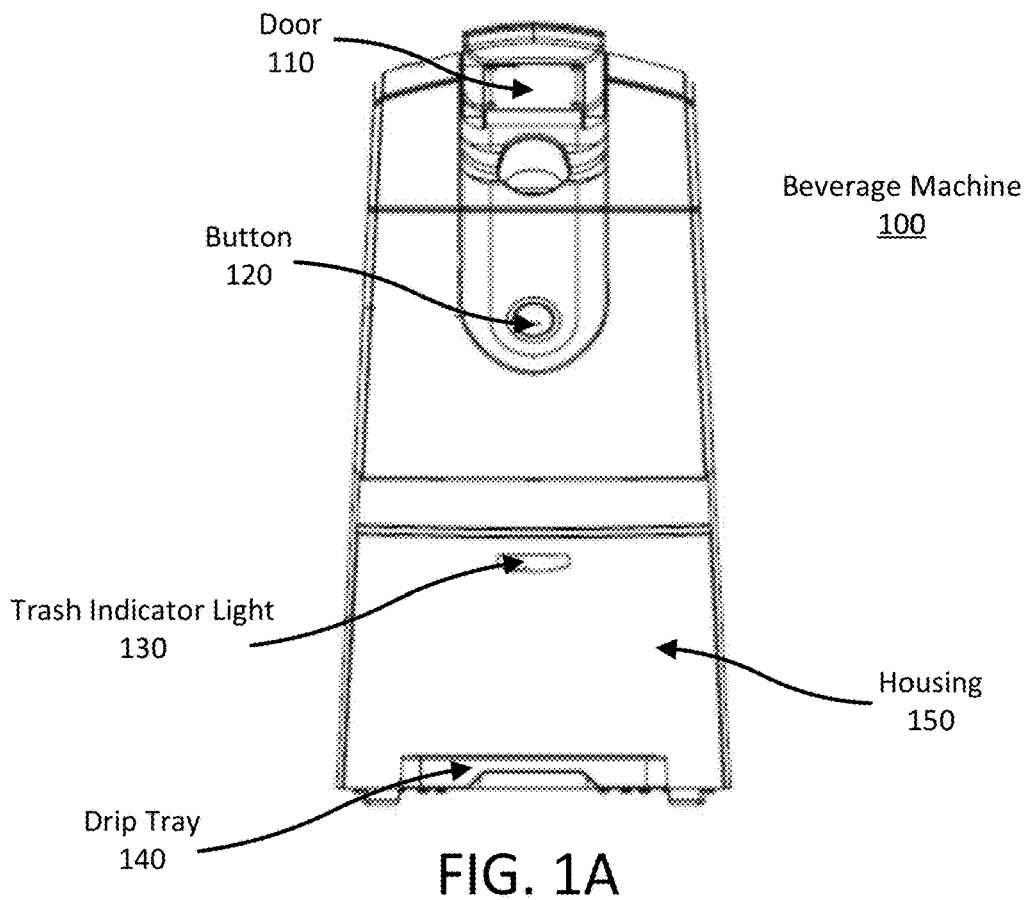
FIG. 1A is a front view of the beverage machine, according to one example embodiment.
Figure 1B:
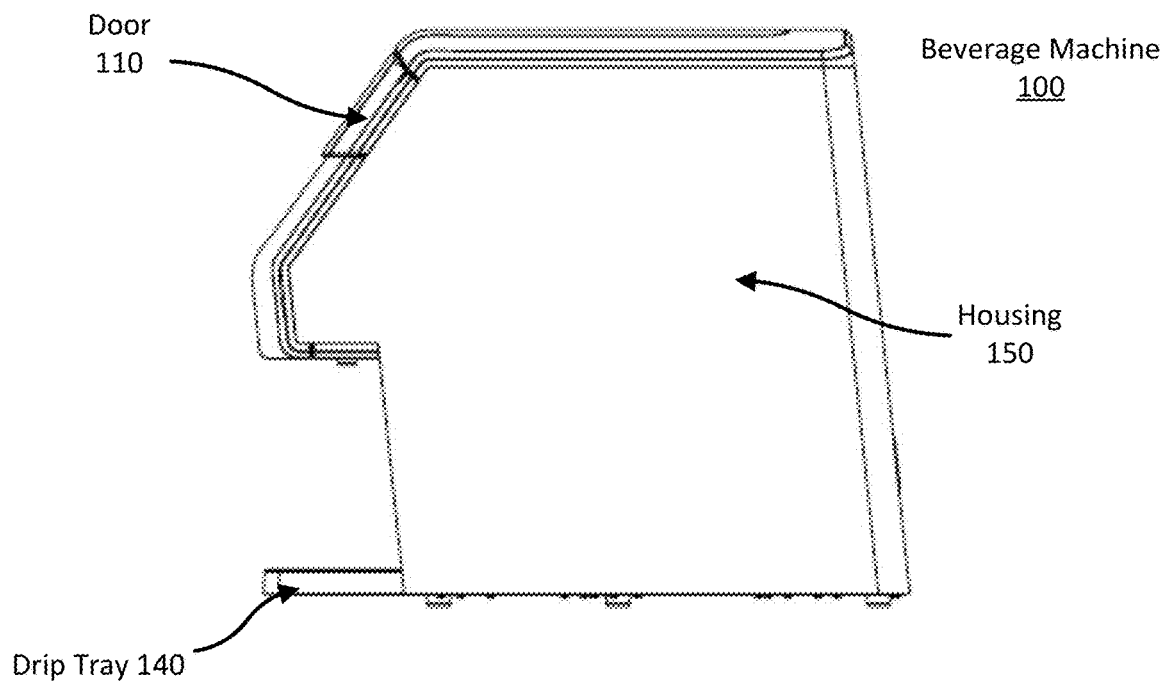
FIG. 1B is a side view of the beverage machine, according to one example embodiment.
Figure 1C:
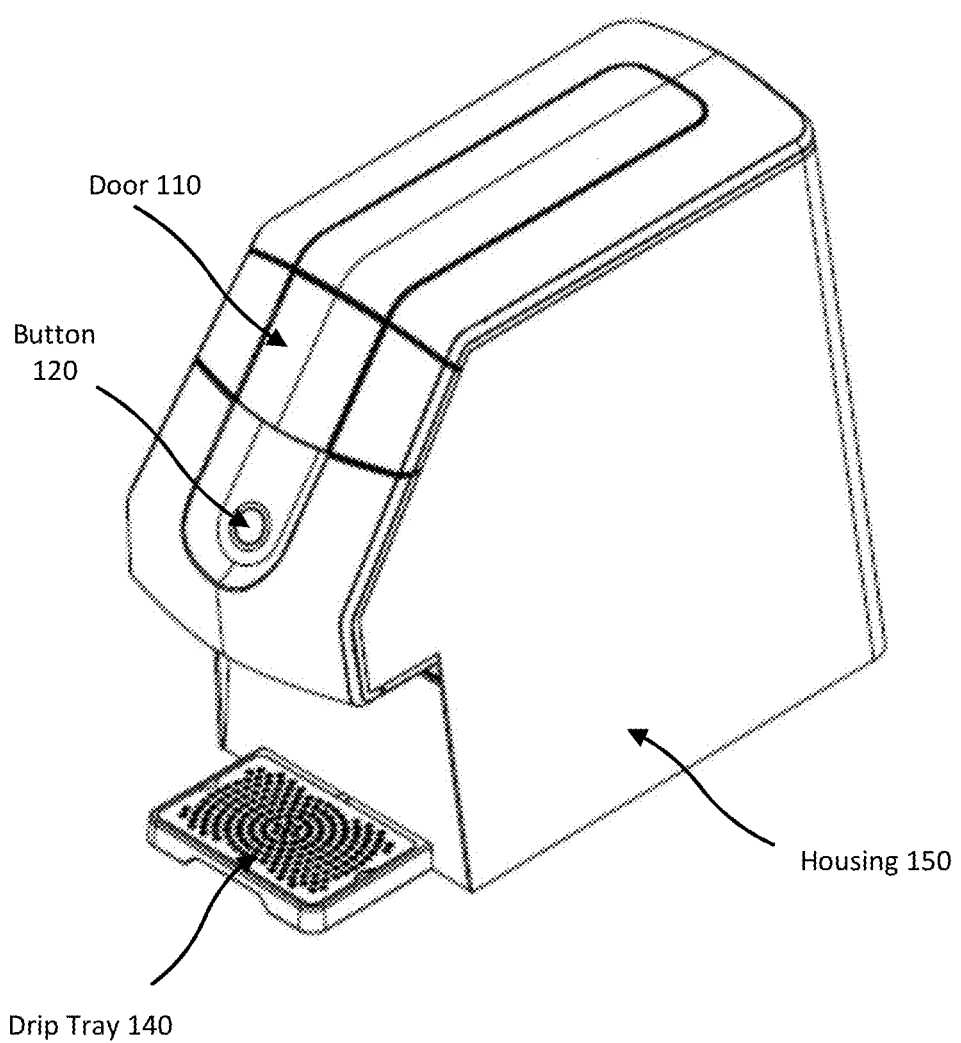
FIG. 1C is an isometric view of the beverage machine, according to one example embodiment.

FIGS. 1A-1C illustrate various view of a beverage machine, according to one example embodiment. Here, FIG. 1A is a front view, FIG. 1B is a side view, and FIG. 1C is an isometric view of the beverage machine 100. The beverage machine 100 includes a door 110, a button 120, a trash indicator light 130, a drip tray 140, and a housing 150. The door 110 encloses a beverage pod input area which opens when the button 120 is pressed to start the brew processes. The brew process is described in more detail in regards to FIGS. 5 and 6. During the brew processes the beverage machine 100 can dispense the beverage into a cup that the user can insert onto the drip tray 140. The trash-indicator light 130 indicates when the compost bin is full and needs to be emptied. The button 120 allows the user to start the brew process and the housing 150 houses internal components of the beverage maker 100. In some configurations (not illustrated), the beverage machine can also include an external water reservoir. The external water reservoir is coupled to fluidic systems of the beverage machine such that the beverage machine can use water in the water reservoir to brew the beverage. The water reservoir also include a water inlet that allows a user to add water to the water reservoir, or alternatively, can be fluidically coupled to a water distribution system (e.g., faucet, water-line, etc.) that allows the reservoir to be refilled.

II. Machine Systems

The internal components of the beverage machine 100 multiple components which are internal to the beverage machine housing 150. The following section is a high-level description of the internal components of the beverage machine 100 and how they are mechanically, electrically, and fluidically coupled to one another other within the beverage machine 100. A more robust description of several mechanical elements are provided with FIGS. 8-10 in Section IV: Machine Sub-systems.

II.A Mechanical

Figure 2:
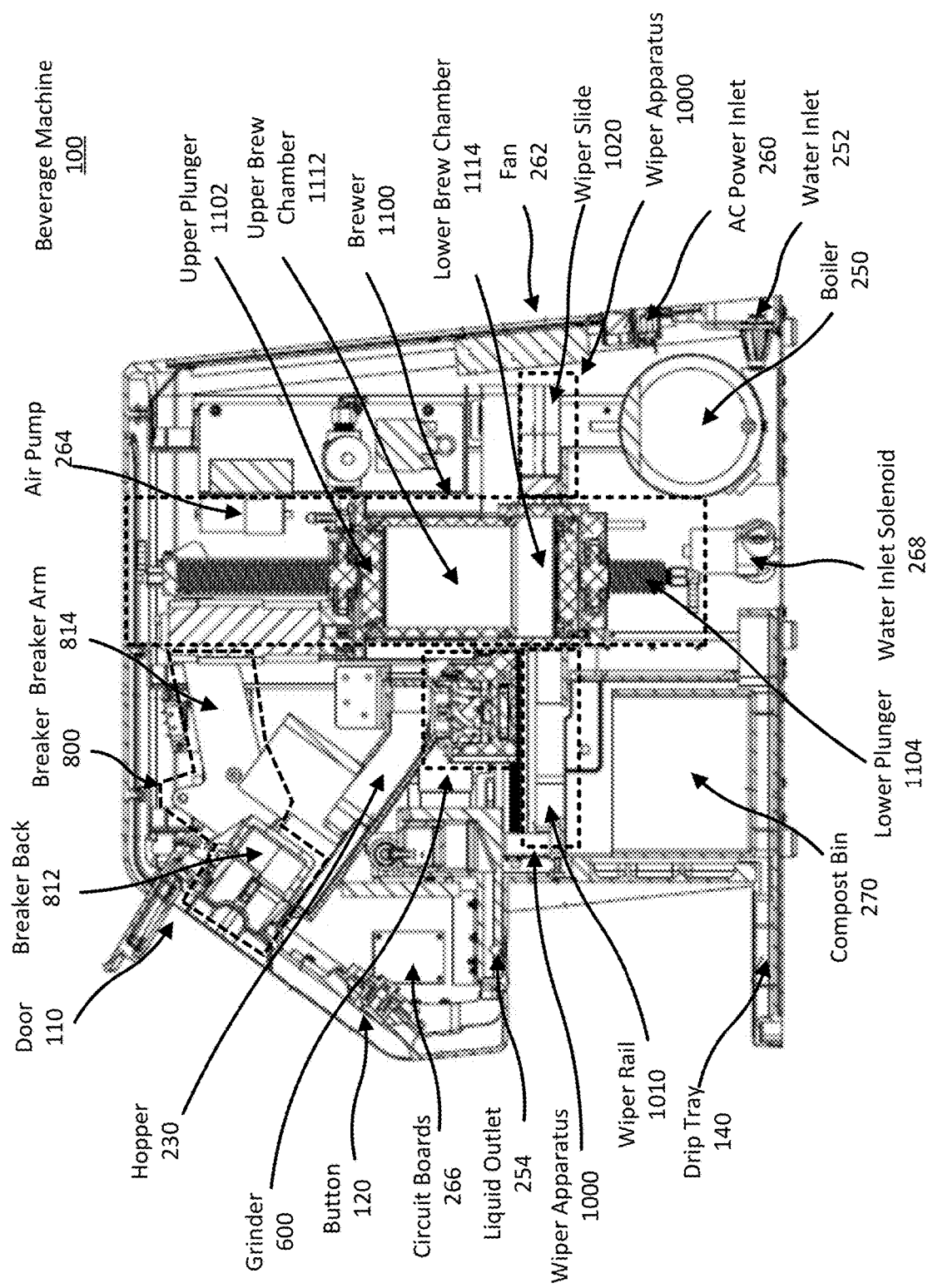
FIG. 2 is a cross-section side view of the beverage machine illustrating internal mechanical systems, according to one example embodiment.
Figure 3:
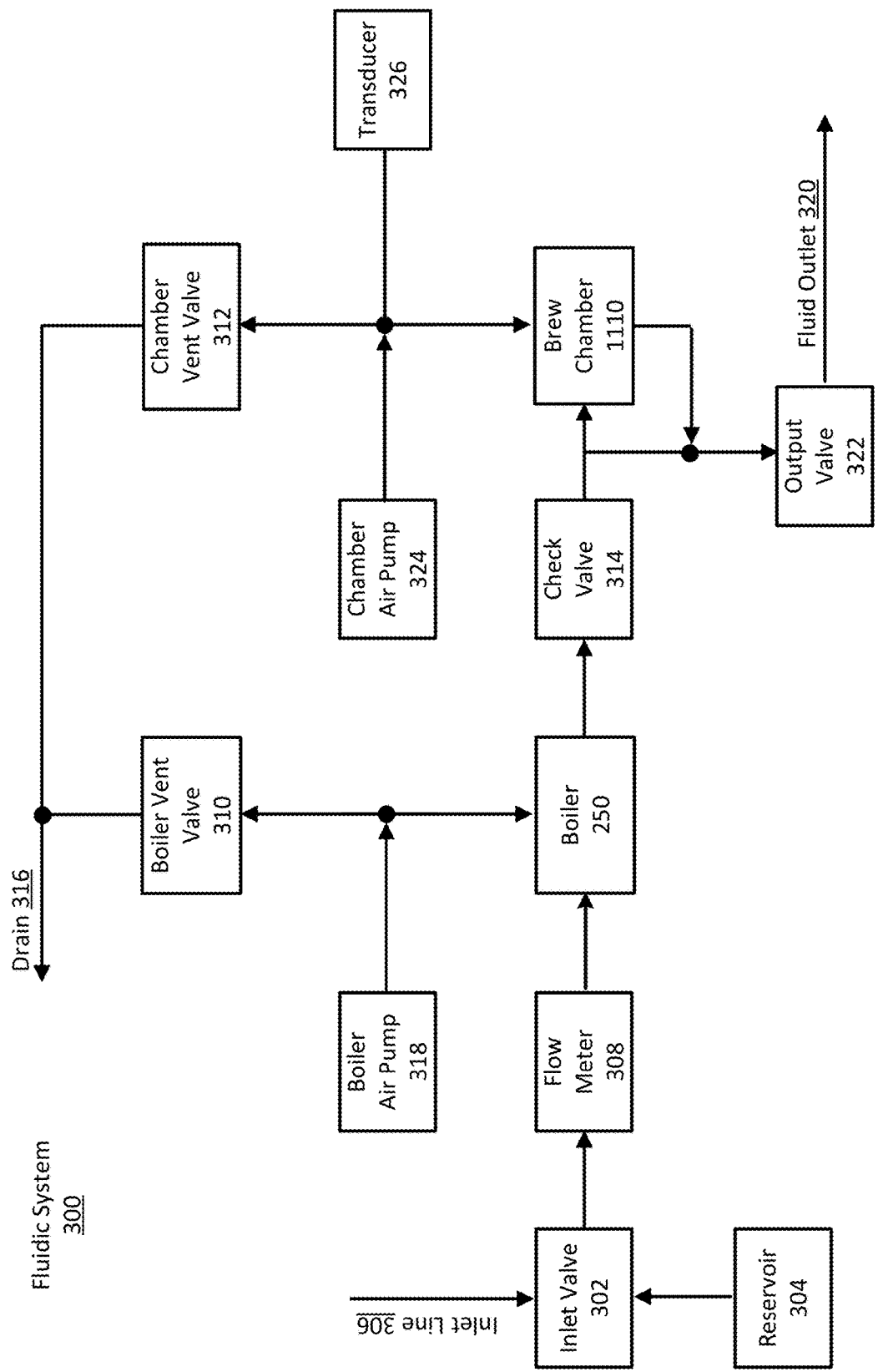
FIG. 3 is diagram of the fluidic system of the beverage machine, according to one example embodiment.

FIG. 2 is a side-view of the beverage machine 100 showing elements of the beverage machine 100 internal to the beverage machine 100 housing 150. The breaker 800, the grinder 900, the wiper 1000, and the brewer 1100, are be discussed in more detail in regards to FIGS. 8-11.

The beverage machine 100 can include a breaker 800 that includes a breaker back 812 and a breaker arm 814. Completely inserting a pod 102 into the breaker 800 situates the beverage pod 102 proximal to the breaker back 812. The breaker back 812 closely surrounds the outside surface of the beverage pod 102 when it is inserted into the beverage machine 100. The breaker arm 814 is coupled to the brewer 1100 such that when the upper plunger 1102 is actuated the breaker arm 814 is actuated. The breaker 800 breaks the beverage pod 102 and release the whole element contents when the beverage pod 102 is inserted into the beverage machine 100 and brew process is started. In other embodiments, the breaker can perform any other action to open the beverage pod 102 such as, for example, cutting, puncturing, peeling, etc. After the pod 102 is open and the contents have been released, the empty pod 102 is ejected from the breaker 800 and into the compost bin 270. The pod is ejected using features in the breaker 800, when actuated by the rotation of the breaker back 812, press into the sides of the pod and move the pod towards the compost bin 270.

The beverage machine 100 includes a grinder 900 that includes a hopper 230. The hopper 230 couples the breaker 800 to the grinder 900. In some configurations, this coupling is mechanical components that are actuated to guide the whole elements from the broken pod into the grinder 900. In another configuration, the hopper allows gravity to guide the elements from the broken pod into the grinder 900. The grinder 900 is grinds whole elements from the broken pod into sub-elements (e.g. grinding coffee beans into grounds). The grinder 900 also allows sub-elements to move to the wiper apparatus 1000 as they are ground. In one configuration the grinder 900 can include mechanical components that are actuated to guide the whole elements from the grinder 900 to the wiper apparatus 1000. In another configuration the grinder 900 allows gravity to guide sub-elements to the wiper apparatus 1000.

The wiper apparatus 1000 includes a wiper rail 1010 and dual-sided wiper slider 1020. The wiper apparatus 1000 couples the grinder 900 to the brewer 1100. Additionally, the wiper apparatus 1000 couples the brewer 1100 to the compost bin 270. Actuation of the wiper apparatus 1000 causes the wiper slider 1020 to move along the wiper rail 1010. As the wiper slider 1020 moves along the wiper rail 1010, grounds from the grinder 900 move into the brewer 1100 or move from the brewer 1100 to the compost bin 270.

Generally, the wiper apparatus 1000 is described as having two states: the 'in-state' and the 'out-state.' In the in-state, the wiper slider 1020 is positioned on the wiper rail 1010 such that sub-elements from the grinder 900 are slid towards the brewer 1100 as the wiper apparatus 1000 is actuated from the in-state to the out-state. In the out-state, the wiper slider 1020 is positioned on the wiper rail such that sub elements remaining in the brewer 1100 after the brew process are slid towards the compost bin 270 as the wiper apparatus 1000 is actuated from the out-state to the in-state. In one embodiment, the in-state can also be the 'home-state,' or the state which is achieved when the beverage machine 100 goes through the homing process. In one embodiment, a wiper motor actuates the wiper slider 1020 from the in-state to the out-state. In an alternative embodiment, a single motor of the beverage machine 100 actuates all mechanical components including those of the wiper apparatus 1000. In other configurations, the in-state and the out state can be reversed.

The brewer 1100 includes the upper plunger 1102, the lower plunger 1104, the upper brew chamber 1112, and the lower brew chamber 1114. The upper brew chamber 1112 couples to the lower brew chamber 1102 with a fluid tight seal such that the upper brew chamber 1112 and lower brew chamber 1114 form a vessel and can act as the brewing chamber 810 for the brew process.

The brewer 1100 is mechanically coupled to the breaker 800 such that as upper plunger 1102 is actuated the breaker arm 814 is actuated to break the beverage pod 102 with a breaking force. Generally, the breaking force is any force applied from the breaker 800 to the pod 102 that causes the pod to break and release its internal elements. In one configuration, the breaker 800 applies a breaking force to the pod when the brewer 1100 actuates the breaker arm upwards (or downwards) such that the breaker arm induces failure a failure mechanism of the pod. In other cases, the breaking force can puncture a top or lower surface of the pod, slice the pod in half, or perform any other method of opening the pod.

The brewer 1100 is mechanically coupled to the wiper apparatus 1000 such that the wiper apparatus 1000 moves grounds in to, or out of, the brew chamber 1110 when the upper brew chamber 1112 is decoupled from the lower brew chamber 1114. Further, the brewer 1100 is coupled to the wiper apparatus 1000 such that the wiper slider 1020 can pass through the brewer 1100 when the upper brew chamber 1112 is decoupled from the lower brew chamber 1114.

The upper plunger 1102 moves the upper brew chamber 1112, and the lower plunger 1104 moves the lower brew chamber 1114 when actuated by the beverage machine 100. Generally, the upper plunger 1102 and the lower plunger 1104 can each be described as having two states: the 'up-state' and the 'down-state.' In the up-state, the upper plunger 1102 positions the upper brew chamber 1112 away from the wiper apparatus 1000 and increases the volume of the brewer 1100. In the down-state, the upper plunger 1102 positions the upper brew chamber 1112 towards the wiper apparatus 1000. Actuating the upper plunger 1102 to the down state can further actuate the breaker arm 814 to break the beverage pod 102 and release the internal elements. In the up-state, the lower plunger 1104 positions the lower brew chamber 1114 towards the wiper apparatus 1000 and brings sub-elements that have been moved into the lower brew chamber 1114 towards the upper brew chamber 1112. In the down-state, the lower plunger 1104 positions the lower brew chamber 1114 away from the wiper apparatus such that when the wiper apparatus 1000 moves from the in-state to the out-state sub-elements are deposited into the lower brew chamber 1114. The lower plunger 1104 can also include a third 'removal-state' in which the lower brew chamber 1114 is flush with the wiper apparatus 1000 such that the wiper slider 1020 can move grounds from the brewer 1100 to the compost bin 270 when the wiper apparatus is actuated from the out-state to the in-state. The home position of the upper plunger 1102 is the up-state, and the home position for the lower plunger 1104 is the down-state.

The upper brew chamber 1112 and the lower brew chamber 1114 have an 'up-position' and a 'down-position.' The up-position of each chamber is the position of the chamber when their respective plungers have been actuated to the up-state, and the down-position of each chamber is the position of the chamber when their respective plungers have been actuated to the down-state. In one embodiment, the brewer 1100 includes a brew motor for actuating components of the brewer 1100 to their up-position and down-position. In another embodiment, a single motor of the beverage machine 100 actuates all components of the beverage machine.

In some configurations, the beverage machine 100 does not include a lower brew chamber 1114. In these examples the lower plunger 1104 is, effectively, in the removal state such that the wiper apparatus 1000 can move elements in to and out of the brew chamber. Here, the upper brew chamber 1114 is configured to couple to the lower plunger when brewing a beverage and the wiper apparatus 1000 is configured to remove grounds after the beverage has been brewed The beverage machine 100 can also include a variety of electrical components such as an A/C power inlet 260, a fan 262, various air pumps 264, circuit boards 266, various solenoids 268 for controlling fluidic systems and a variety of actuators (e.g. motors). The A/C power inlet 260 inputs power for components of the machine when the beverage machine 100 is powered on for operation. Generally the A/C power inlet 260 is coupled to a power source during installation. The fan 262 cools components of the beverage machine 100 during operation by circulating cooler air to internal components of the beverage machine 100. The air pumps 264 are coupled to various components of the system to aid in moving liquid throughout the beverage machine 100 fluidic system by pressurizing and depressurizing various components. For example, the air pump 264 is energized to move air into the brew chamber and out of the liquid outlet 254. The circuit boards 266 include computational components to control the operation and processes of the beverage machine 100. The actuators (e.g. motors, etc.) are coupled to components of the beverage machine 100 to mechanically actuate the components they are coupled to. For example, the actuators can move the upper plunger 802, the lower plunger 1104 and the wiper slider 1020. Additionally, the actuators can energize components of the beverage machine 100 to cause their function. For example, the actuators can energize the solenoids, air pumps, and valves to control fluid movement through the system.

The beverage machine 100 includes a boiler system 250. The boiler 250 inputs water from the water inlet 252 and warms the water for use in the brew process. The boiler warms the water to temperatures that the beverage is brewed at. The boiler system can include a pressure sensor, timer, or temperature sensor that allows for the warming rate and final temperature of the water to be controlled by the beverage machine 100. The warming rate and final temperature of the water is indicated by the scanned bar code of the beverage pod. After the brew process the beverage exits the system via the liquid outlet 254.

While the preceding description is of the beverage machine 100 illustrated in the embodiment of FIG. 2, the position, couplings, orientation, and size of the described elements is arranged in any way such that the beverage machine 100 is able to produce a beverage from a beverage pod 102 filled with whole elements. Further, the elements of the beverage machine 100 is coupled in different ways from the preceding description. Finally, the beverage machine 100 can include additional components, duplicated components, or fewer components than those described herein.

II.B Fluidic

FIG. 2B illustrates a diagram of a fluidic system 200 of the beverage machine 100. Generally, fluidic couplings within the beverage machine 100 use plastic tubing but can be any element that allows fluids to move from one component of the machine 100 to another.

The inlet valve 302 controls water entering the beverage machine. The inlet valve can be fluidically coupled to a reservoir 304 and/or an inlet line 306. The reservoir is any component fluidically coupled to the beverage machine that stores a refillable amount of water for the beverage machine to use when brewing a beverage. The inlet line 306 is a continuous water source (e.g., a building plumbing line) fluidically coupled to the beverage machine such that the beverage machine can use the continuous water source to brew beverages.

The inlet valve 302 can be a normally closed direct acting solenoid valve which controls water flow. That is, when the solenoid is energized by the beverage machine 100 the inlet valve 302 allows water to enter the beverage machine 100, and when the solenoid is not energized the inlet valve 302 does not allow water to enter the beverage machine 100. In one example, water can enter the beverage machine from a reservoir 304, while in another embodiment, water can enter the beverage machine from an inlet line 302. In some configurations a water pump may be fluidically coupled to the reservoir 304 to move water from the reservoir into the beverage machine.

The inlet valve 302 is fluidically coupled to a flow meter 308 such that as water enters the beverage machine 100 and passes through the flow meter 308, the flow meter 308 measures the amount of incoming water. The flow meter 308 is coupled to the inlet valve 302 such that the flow meter 308 controls when the inlet valve 302 is energized or de-energized. For example, if the beverage machine 100 is brewing a 12 oz. beverage, the flow meter de-energizes the inlet valve 302 once 12 oz. of water has entered the beverage machine 100.

The flow meter 308 is fluidically coupled to a boiler 250 such that the measured amount incoming of water enters the boiler 250. The incoming water enters the boiler 250, resulting in a displacement of water to leave the boiler 250.

Water entering the brew chamber 1110 is controlled by the boiler vent valve 310, the chamber vent valve 312, and the check valve 314. The boiler vent valve is a normally open pilot solenoid valve. That is, Energizing the normally open pilot solenoid valve (i.e. boiler vent valve 286) and the normally closed direct acting solenoid valve (i.e. chamber vent valve 288) can result in the water passing through the check valve 292 and into the brewer 1100.

The boiler vent valve 310 and the chamber vent valve 312 are fluidically coupled to the drain 316. Controlling the vent valves controls how, and if, water exits the system 200 via the drain 316. In this example, energizing the boiler vent valve 310, and de-energizing the chamber vent valve 312 allows water to exit the system 200 via the drain 316. Similarly, de-energizing the boiler vent valve 310, and energizing the chamber vent valve 312 prevents water from exiting the system via the drain.

The boiler 250 is fluidically coupled to the brew chamber 1110 such that the boiler 250 fills the brew chamber 1110 with water that passes the check valve 314 as previously described. Additionally, the brew chamber 1110 is fluidically coupled to the chamber vent valve 312 such that as the water fills the brew chamber 1110, excess water moves from the brew chamber 1110 to the drain 316 via the brew chamber vent valve 312.

Water or beverage exits the system via a fluid outlet 320 controlled by an output valve 322. The output valve 322 is a normally closed solenoid valve. Whether water or brewed beverage exits the system 200 via the output valve 322 depends on the configuration of the various components of the system.

Water from the boiler can move be transferred into the brew chamber 1110 or out of the system 200 via the fluid outlet. In either case, the water level in the boiler 250 is adjusted with a boiler air pump 318 energized in conjunction with the boiler vent valve 310. For fluid to move into the brew chamber 1110 the beverage machine 100 energizes the chamber vent valve 312 in conjunction to the boiler air pump and boiler vent valve. For fluid to move out of the fluid outlet 320, the beverage machine 100 energizes the chamber vent valve 312 in conjunction to the boiler air pump 318 and boiler vent valve 310.

To agitate the water in the brew chamber 1110, the boiler air pump 318 is energized in conjunction with the boiler vent valve 310 and the chamber vent valve 312. The air is introduced such that the water in the brew chamber 1110 (if present) is agitated.

To dispense a beverage from the output valve 322, the beverage machine 100 energizes a brew chamber air pump 324 in conjunction with the output valve 294 to expel water from the brew chamber 1110 to the fluid outlet 276.

In some instances water can move from the boiler to the drain. For example, if the boiler vent valve 310, the solenoid of the brew chamber vent valve 312, and the output valve 4 are not energized, then water passes from the boiler 250 to the drain 316.

A pressure transducer 326 is used by the beverage machine 100 to monitor the pressure in the brew chamber 1110 and fluid outlet 320. This pressure is used to by the beverage machine 100 to determine when to energize solenoids and air pumps.

In some configurations (not shown) the system can also include a fluidic coupling between the brew chamber and the drain. This allows for water to exit the brew chamber 1110 after a "rinse process" executed after brewing a beverage. The rinse process fills the brew chamber 1110 with water and which is then removed via the drain 316.

II.C Electrical

Figure 4:
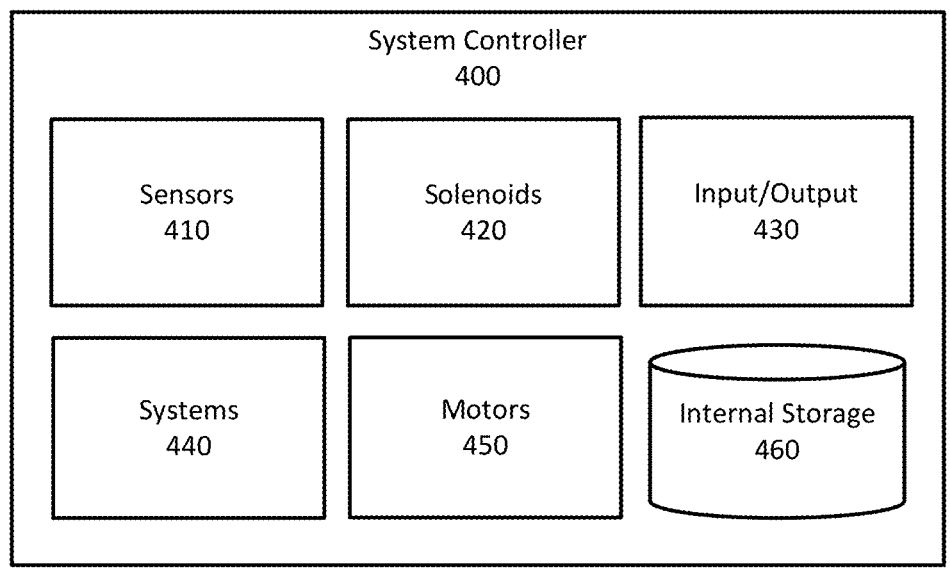
FIG. 4 is a diagram of the control system of the beverage machine, according to one example embodiment.

FIG. 4 is a diagram of the system controller 400 for the beverage machine. The system controller 400 can be used to control the various components of the beverage machine 100 such as, for example, sensors 410, solenoids 420, I/O devices 430, systems 440, motors 450, and internal storage 460. In an example embodiment, the system controller 400 can be implemented as a processor executing computer instructions for operating the various elements of the beverage machine. Generally, the system controller is connected to an AC power supply via the AC power inlet 260. The AC power received from the inlet is converted to DC power using a DC power supply. In some configurations, various elements of the beverage machine controlled by the system controller can be operated with either DC and or AC power.

The sensors 410 can include a reservoir level sensor, a boiler level sensor, a temperature sensor, and a pressure sensor. The reservoir level sensor senses an amount of water in the reservoir 304. The boiler level sensor senses an amount of water in the boiler 250. The temperature sensor can sense the temperature of the water and/or beverage in the boiler and/or brew chamber 1110. The pressure sensor can sense the pressure at any point in the fluidic system 200. The sensors can also include a filter sensor that determines when a filter of the brewer 1100 needs to be changed.

The solenoids 420 can be energized or de-energized to control their corresponding valves. For example the solenoids 420 can be the solenoids 420 controlling the boiler vent valve 310, the chamber vent valve 312, the inlet valve 302, or the output valve 322.

The input/output devices 430 are used to input information to, or output information from, the beverage machine 100. The I/O devices can include a display device configured to display information, such as, for example, the brewing process, to a user of the beverage machine 100. The data reader can be any device capable of reading the machine readable indicator on the beverage pod. Additionally, I/O devices can include a network connection 436 that allows the beverage machine to connect to a network. The network can be any type of wired or wireless network such as Bluetooth, the Internet, etc. The network connection allows the beverage machine 100 to receive information about the elements or the brewing process via a network.

The system controller 400 can also control the systems 440 (e.g., power on/power off, increase or decrease power, etc.) of the beverage machine such as the boiler 250, air pumps, water pumps 444, the grinder, etc.

The system controller can control motors that actuate the various systems. Motors can include motors that actuate the brewer 1100, the wiper apparatus 1000, mechanical valves, etc.

The system controller 400 can include an internal storage 460. The internal storage 460 is any medium that allows the beverage machine 100 to store information. For example, the internal storage 460 can be a hard drive, an SSD, or any other type of physical computer memory. The internal storage stores information, or computer commands, that allows the beverage machine to brew a beverage from a beverage pod. In some cases, the internal storage can store information regarding the brew processes for various beverages.

III Machine Processes

In one embodiment, the beverage machine 100 functions as single cup coffee brewer within an office environment. The beverage pod 102 can contain whole beans which are ground into coffee grounds and brewed into coffee which is dispensed into a cup. Alternatively, the beverage pod 102 can contain whole tea leaves which are ground into smaller tea leaves and steeped into a tea which is dispensed into a cup.

Figure 5:
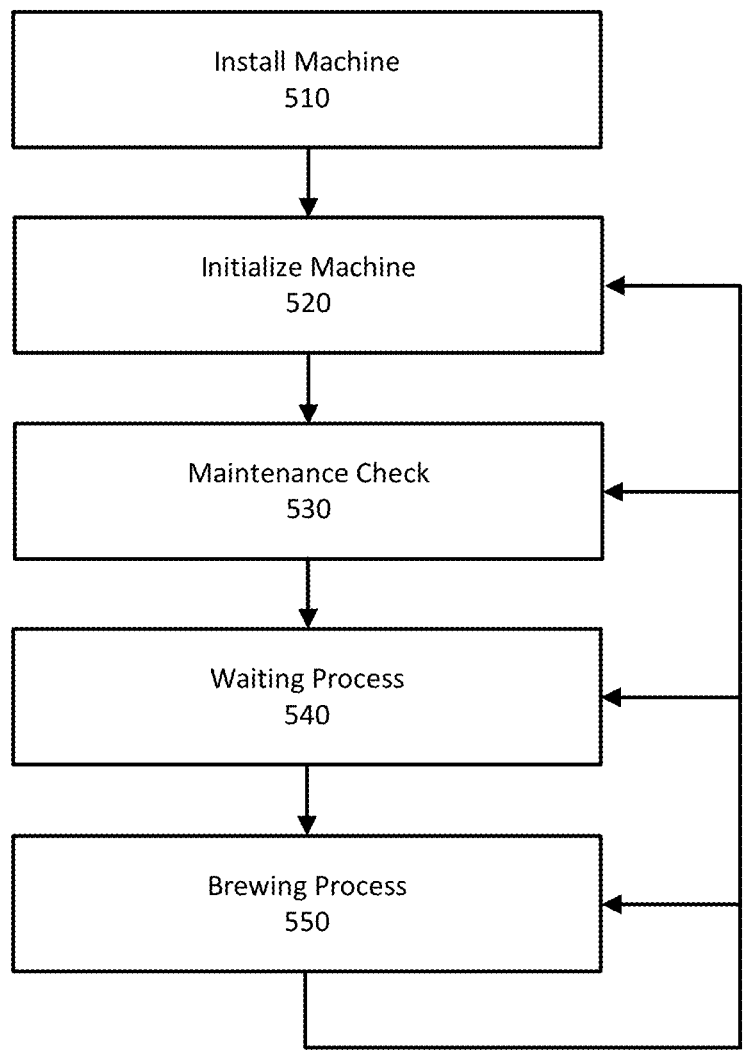
FIG. 5 is a flow chart illustrating the high-level processes of the beverage machine, according to one example embodiment.
Figure 6:
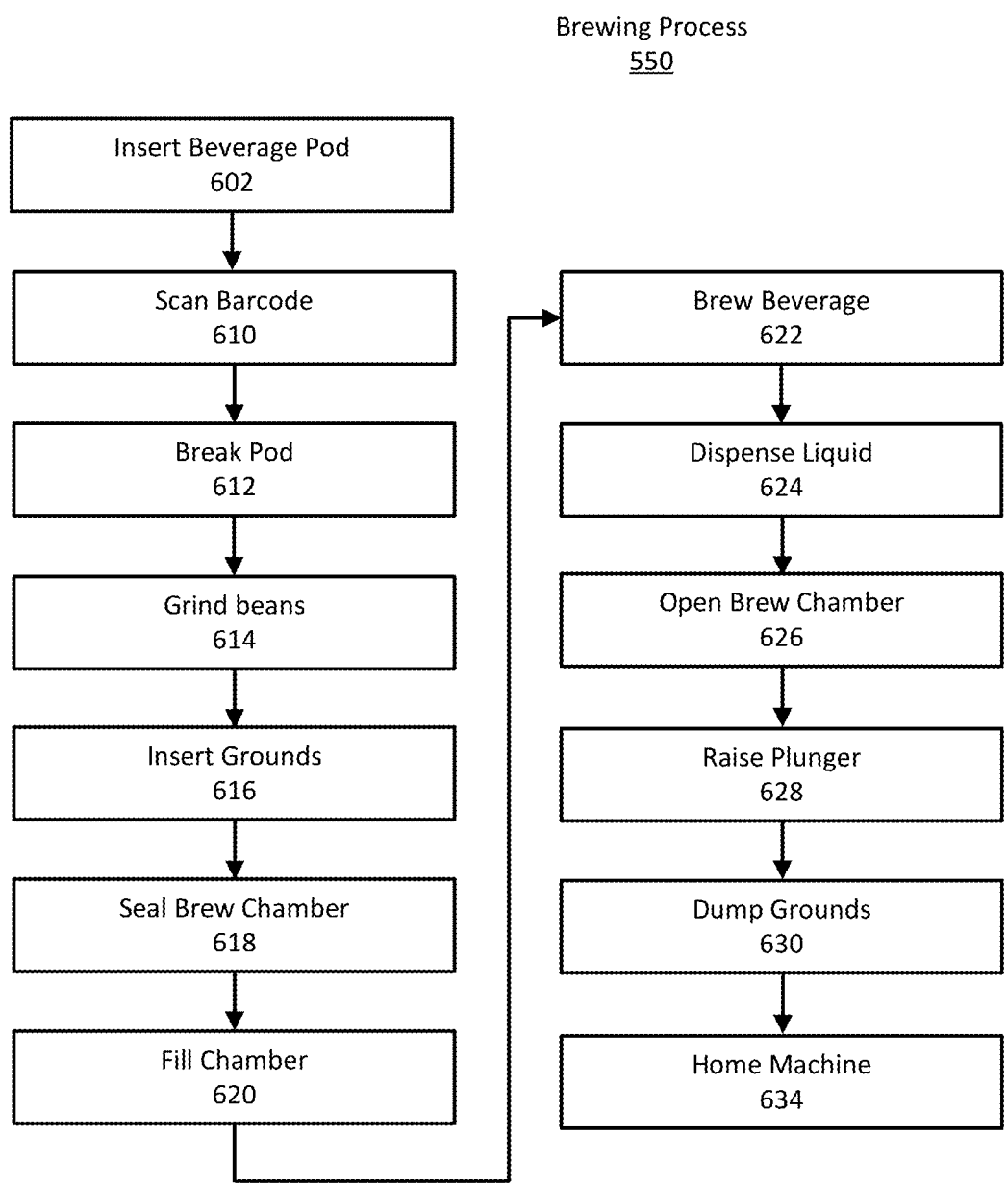
FIG. 6 is a flow chart of the brewing process of the beverage machine, according to one example embodiment.

The following process elements of FIGS. 5 and 6 are described in a specific order in one example embodiment. However, any elements of the processes of FIGS. 5 and 6 can occur in any order, can include additional elements, or fewer elements.

III.A General

FIG. 5A is a flow-chart describing the general use process of the beverage machine 100 functioning as a coffee maker. To begin, the beverage machine 100 is installed 510. To install 510 the beverage machine 100, the beverage machine 100 is coupled to a power source and a water source such that the beverage machine 100 is able to execute the processes to brew a cup of coffee. Generally the beverage machine 100 is powered by coupling the beverage machine 100 to a standard wall power connection and using a system on/off switch. Additionally, the beverage machine 100 is plumbed directly into the building water such that the beverage machine 100 is fluidically coupled to a public water source. Alternatively, water is added to a water reservoir 304 such that the water can be pumped into the beverage machine 100.

After the beverage machine 100 is installed 510, the beverage machine 100 is initialized 520. To initialize 520 the beverage machine 100, the beverage machine 100 is powered on and the beverage machine 100 executes any of the various initialization processes described in Section III.B Initialization. Initializing 520 the beverage machine 100 prepares components of the beverage machine 100 to run the brewing process 350. Additionally, initializing 520 the beverage machine 100 can access a network using the input/output interface 430. In one example, initializing 520 pairs the beverage machine 100 to a user device using a Bluetooth connection or, alternatively, connects the beverage machine 100 to the internet.

After, or during, the initialization 520 process the beverage machine 100 runs a maintenance check 530 to check for abnormal states of the beverage machine 100. The abnormal states of the beverage machine 100 are described in Section III.C Abnormal states. The maintenance check 530 validates that the beverage machine 100 is functioning nominally, the compost bin 270 is empty, and no other operating abnormalities are detected.

At this point the beverage machine 100 starts a waiting process 540 and waits for a user to start a brewing process 550. The user starts the brewing process by interacting with the button 120 on the beverage machine housing 150 or using a device connected to the beverage machine 100. Once the brewing process 350 is complete (or, in some embodiments, during the brewing process 350), the beverage machine 100 dispenses the beverage into a cup that has been placed onto the drip tray 150. If the brewing process 350 completes without an error, the beverage machine 100 re-enters that waiting process 540. If there is an error, the beverage machine 100 enters the initialize machine 520 or maintenance check 530 steps. The waiting process 540 and the brewing process 350 are described in more detail in sections III.D Waiting Process and III.E Brewing Process.

III.B Initialization

Various subsystems have "home" positions and/or "states" that are generally achieved in a predefined sequence. Achieving these states is referred to as initializing 520 the beverage machine 100 or homing the beverage machine 100.

First Initialization: Regular Startup

When the beverage machine 100 is operating nominally, it executes a regular startup sequence to initialize 520. First, the lower plunger 1104 is moved to the down state. Second, the upper plunger 1102 is lowered to the down-state if the wiper slider 1020 is not in the in-state. Third, the beverage machine 100 returns the wiper slider 1020 to the in-state, if not there already. Fourth, the upper plunger 1102 is moved to the up-state. If a predetermined amount of time elapses during the execution of any of these steps without the steps being completed, the beverage machine 100 enters maintenance mode Second Initialization: After Power Loss In some instances, the beverage machine 100 starts up after loss or power or a microcontroller reset and the beverage machine 100 executes an after power loss initialization 520 process. First, if the power has been cycled or the microcontroller has been reset the beverage machine 100 can do the following: read from the circuit boards 226 (e.g., EEPROM) to determine the number of pods in the compost bin 270, detect if the beverage machine 100 was brewing, or detect if an error has occurred while executing a process. If the beverage machine 100 detects an error it enters maintenance mode; if the beverage machine 100 detects that it was brewing, the beverage machine 100 runs a brewer reset sequence; if the beverage machine 100 determines that the compost bin is full, the beverage machine 100 enters empty compost bin mode; if the beverage machine 100 detects no errors, detects that it was not brewing, and determines that the compost bin 270 is not full, the beverage machine 100 runs a regular startup to initialize 520.

Third Initialization: Brewer Reset

If a power failure or microcontroller reset has occurred during a brew cycle as described in the after power loss initialization 520 process, the beverage machine 100 can execute a brewer reset process. In the brewer reset process the beverage machine 100 expels any water from the brewer 1100, purges the grinder 900 of any coffee beans, and disposes of grounds into the compost bin 270.

To do this, first, the brewer 1100 is purged to remove water from the brew chamber 1110 by adding air into the brew chamber 1110. The amount of water in the chamber is measured by a pressure sensor. Next, the lower plunger 1104 is lowered into the home position and the upper plunger 1102 is also lowered (such that the breaker disposes of the beverage pod, if any). Subsequently, the wiper is moved to the out-state and the grinder 900 grinds any remaining coffee beans. The grinder 900 measures the motor current to determine if beans remain in the grinder 900. Next, the beverage machine 100 raises the lower plunger 1104 to the 'up-state' and slides the wiper to the 'in-state.' Finally, the beverage machine 100 moves the lower plunger 1104 to the 'down-state' and moves the upper plunger 1102 to the 'up-state.' If a predetermined amount of time elapses during the execution of any of these steps without the steps being completed, the beverage machine 100 enters maintenance mode.

III.C Maintenance Mode

Throughout operation, the beverage machine 100 may find itself in abnormal states that cause the brewing machine to enter specialized modes. The beverage machine 100 can be found in an abnormal state during any of the described processes in this section. To exit the abnormal state, the beverage machine 100 may execute a process that aids in maintaining the integrity of the beverage machine 100 or allows a user to correct the abnormal state.

First Abnormal State: Empty Compost Bin

The compost bin of the beverage machine 100 stores a certain number of beverage pods 102 and grounds and needs to be emptied when the predetermined number is reached. The beverage machine 100 logs usage and enters empty compost bin mode when the beverage machine 100 determines that the number of brewed coffee cups reaches a predetermined threshold. When this occurs, the empty compost bin mode executes the empty compost bin process. First, all motors of the beverage machine 100 are disabled and the beverage machine 100 ignores a user request to run the brewing process. If a preset amount of time has elapsed since the last user interaction, the beverage machine 100 enters idle mode or sleep mode (depending on the preset amount of time). If the compost bin is removed for a predetermined amount of time, the coffee cup count is reset to zero and if the compost bin is correctly inserted into the beverage machine 100, the beverage machine 100 enters waiting for user mode.

Second Abnormal Status Mode: Maintenance Mode

If an error occurs while operating machine, the beverage machine 100 enters maintenance mode. In maintenance mode the following can occurs: the heating element of the boiler is disabled, the motors of the beverage machine 100 are disabled, and the beverage machine 100 ignores a user request and not be able to run the brew coffee process. To exit maintenance mode, the beverage machine is re-initialized (assuming that the error causing maintenance mode has been corrected).

III.C Waiting Process

Once the beverage machine 100 has performed an initialization 520 and maintenance check 530, it enters the waiting 540 process. For this to occur, generally, the compost bin 270 is not full and the beverage machine 100 has not encountered an error and entered maintenance mode during initializing 520 or maintenance checks 530. If the beverage pod 102 door is open or the compost bin is not present (determined by mechanical switches and/or optical sensors) the beverage machine 100 requires the door 110 to be closed or the compost bin replaced 270 before entering the waiting process.

When the beverage machine 100 is in waiting 540 for user mode, a user of the beverage machine 100 can initiate the brewing process 550 (main user button 110 pressed and released, or instruction received via the network), or the beverage machine 100 enters idle or sleep mode after a preset amount of time has elapsed without any user interaction.

While the beverage machine 100 is in the waiting process, a variety of different modes or processes is triggered. First, if the beverage pod 102 door 110 is opened, the beverage machine 100 enters pod door opened mode and the beverage machine 110 waits for the beverage pod 102 door to be closed. Second, if the compost bin 270 is removed or not inserted fully into the beverage machine 100, the beverage machine 100 enters the compost bin missing mode and waits for compost bin 270 to be fully inserted. Third, if a preset amount of time has elapsed since the last user interaction, the beverage machine 100 enters idle mode. Fourth, if a preset amount of time has elapsed since the last user interaction, the beverage machine 100 enters sleep mode. Fifth, if the main user button is pressed and released, the beverage machine 100 enters the brewing process.

III.D Brewing Process

When the beverage machine 100 is in waiting for user and a user presses and releases the main user button 120, the beverage machine 100 runs the brewing process 550. Pressing the main user button 120 opens the door 110 to the beverage pod insertion area. In an embodiment, the brewing process 550 can be initialized by a user via a device connected to the brewing machine via a network.

Figure 7A:
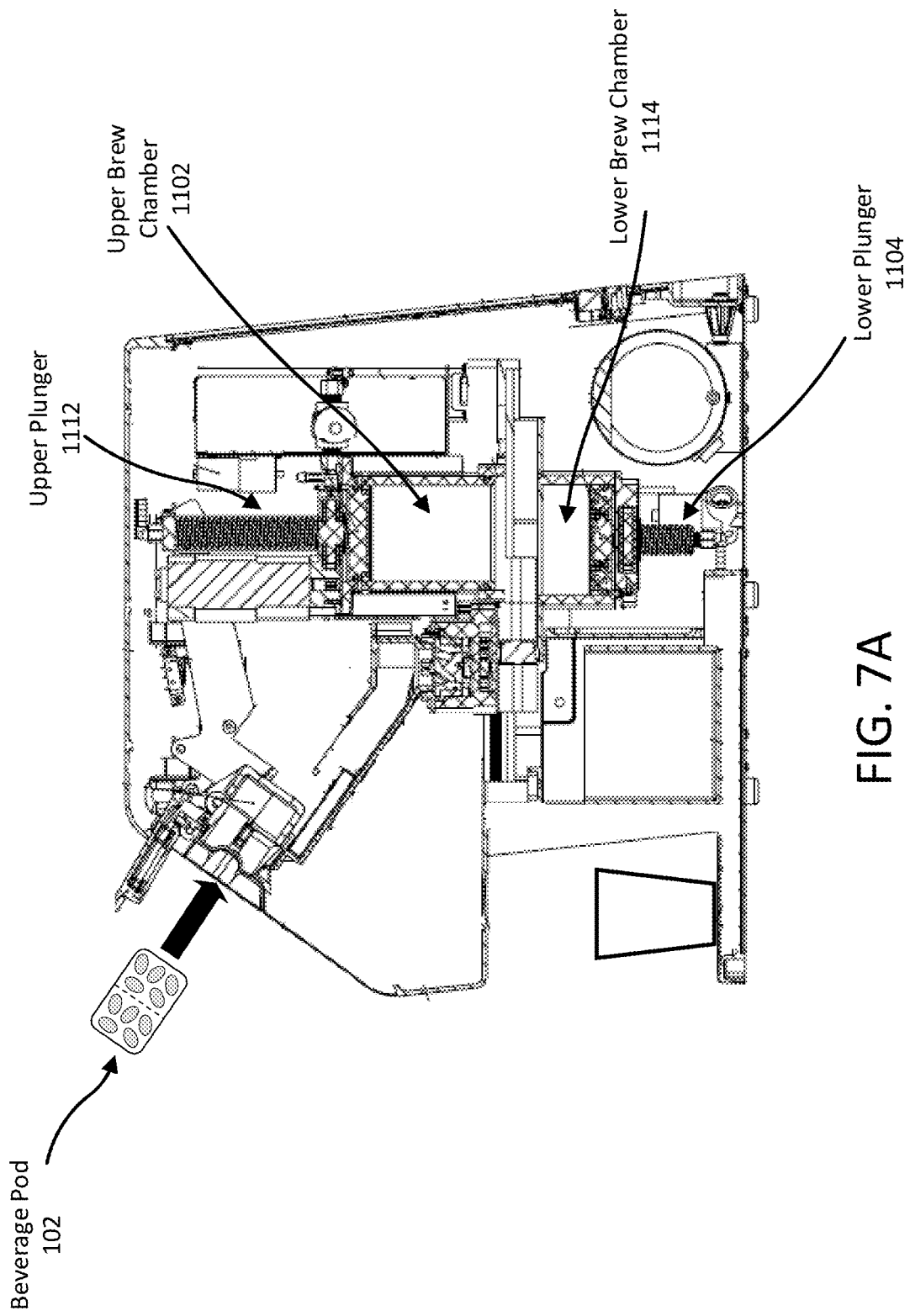
FIGS. 7A-7N illustrate the process of brewing a beverage in the beverage machine with a pod, according to one example embodiment.

FIG. 6 is a more detailed process flow of the brewing process 550. FIGS. 7A-7N demonstrate the steps of the brewing process of FIG. 6. In various embodiments, the brewing process 550 can include additional or fewer steps, or the steps of the brewing process can be performed in a different order.

Step 1: Attempting Barcode Scan

Referring to FIG. 6, when a beverage pod is inserted 602 into the beverage machine 100, the beverage machine 100 attempts to scan 610 the barcode of the beverage pod 102. If the barcode reader successfully scans 610 a barcode but the code is not of the predefined syntax, the beverage machine 100 logs the barcode scan as a failure and return to the waiting process. Scanning the barcode determines information used to brew the beverage during the brewing process 550 (i.e., a "brewing instructions"). If the barcode reader times out after a predefined amount of time, the beverage machine 100 logs the scan as a failure and return to the waiting process. If the beverage machine 100 counts a predefined certain amount of scan failures it enters maintenance mode. If the barcode reader successfully scans 610 a barcode and the code is of the predefined syntax, the beverage machine 100 stores the scanned data and move to the break 612 pod step.

Figure 7B:
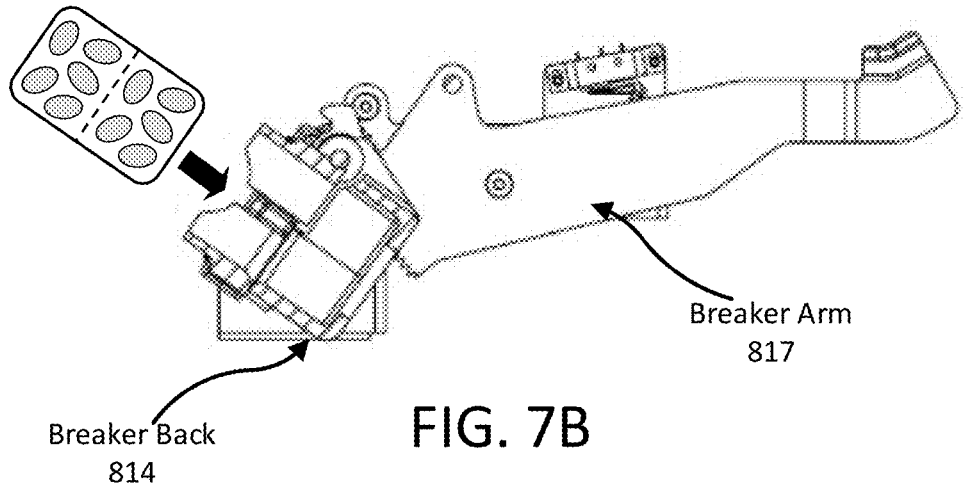
Figure 7C:
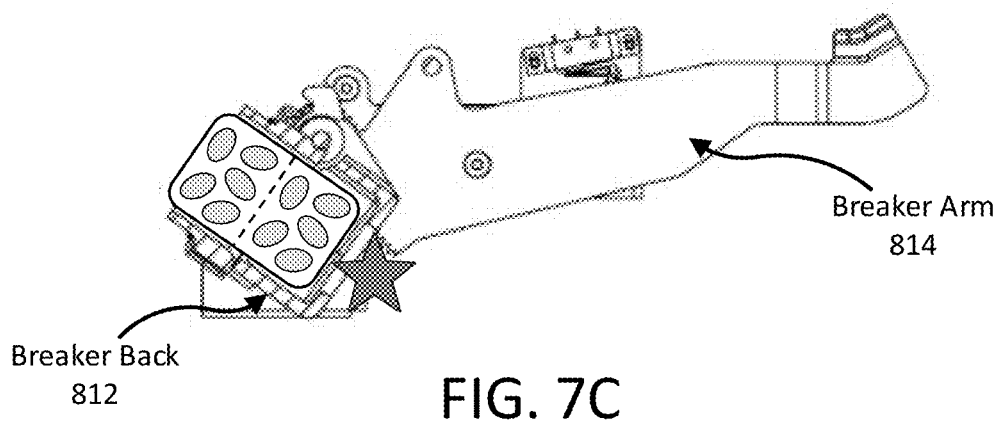

Turning to FIGS. 7A-7C, the beverage machine 110 is initialized 510, i.e. the lower plunger 1104 is in the down state and the lower brew chamber 1114 in the down-position, and the upper plunger 1102 is in the up-state and the upper brew chamber 1112 is in the up-position. The beverage pod 102 is inserted into the beverage machine 100 such that the beverage pod 102 is situated against the breaker back 812 of the breaker 800. The beverage machine scans 610 the barcode of the beverage pod 102.

Step 2: Breaking Pod

Returning to FIG. 6, once the barcode has been successfully scanned 612 and identified, the beverage machine 100 breaks 614 the beverage pod 102. To break the beverage pod 102, the beverage machine 100 lowers the upper plunger 1102 to the 'down-state.' Moving the upper plunger 1102 to the 'down-state' actuates the breaker 800 to break the seal on the beverage pod 102 and allow the beans to exit the beverage pod 102. Once the upper plunger 1102 reaches the 'down-state,' the beverage machine 100 moves to the grind 614 beans step. If a predetermined amount of time elapses before the upper plunger 1102 reaches the down position, the beverage machine 100 enters maintenance mode.

Figure 7D:
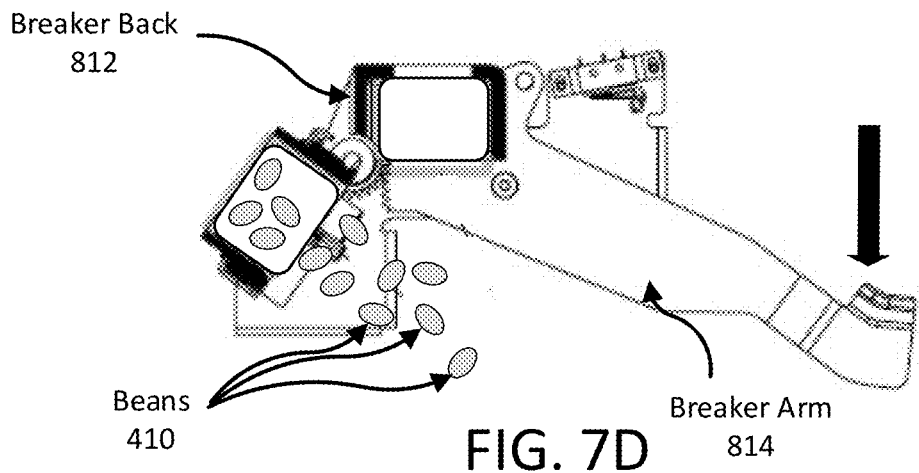

Visualizing this in FIG. 7D, the breaker arm 814 is actuated downwards and the beverage pod 102 breaks, allowing the coffee beans 710 within the beverage pod 102 to exit the beverage pod 102 towards the hopper 232 and the grinder 900. In the illustrated example, moving the breaker arm 814 downwards causes the breaker 800 to apply a force to the beverage pod 102. Generally, the force is created along a failure mechanism in the beverage pod 102 which causes the beverage pod to break along the failure mechanism. Here, the failure mechanism is along the sidewall of the beverage pod 102, and the force is applied to the sidewall such the failure mechanism breaks and the beverage pod is pulled in to two pieces.

Step 3: Grinding Beans

Returning to FIG. 6, once the beverage pod 102 has been broken 612 by the breaker 800 and the beans 710 have moved through the hopper 232 to the grinder 900, the beverage machine 100 grinds the coffee beans 710. To grind the coffee beans 710, the beverage machine 100 energizes the grinder 900 and monitors the grinder motor current. In some examples, the beverage machine can grind 614 the beans according to the brewing instructions. As the coffee beans 710 are ground 614, the grounds 720 move downwards through the grinder 900 and onto the wiper apparatus 1000. If the grinder motor current drops below a predefined threshold for a predefined amount of time, the beverage machine 100 turns off the grinder motor and transitions to the inserting grounds step. If the grinder motor current does not drop below a predefined threshold and a predefined amount of time has elapsed, the beverage machine 100 enters maintenance mode.

Figure 7E:
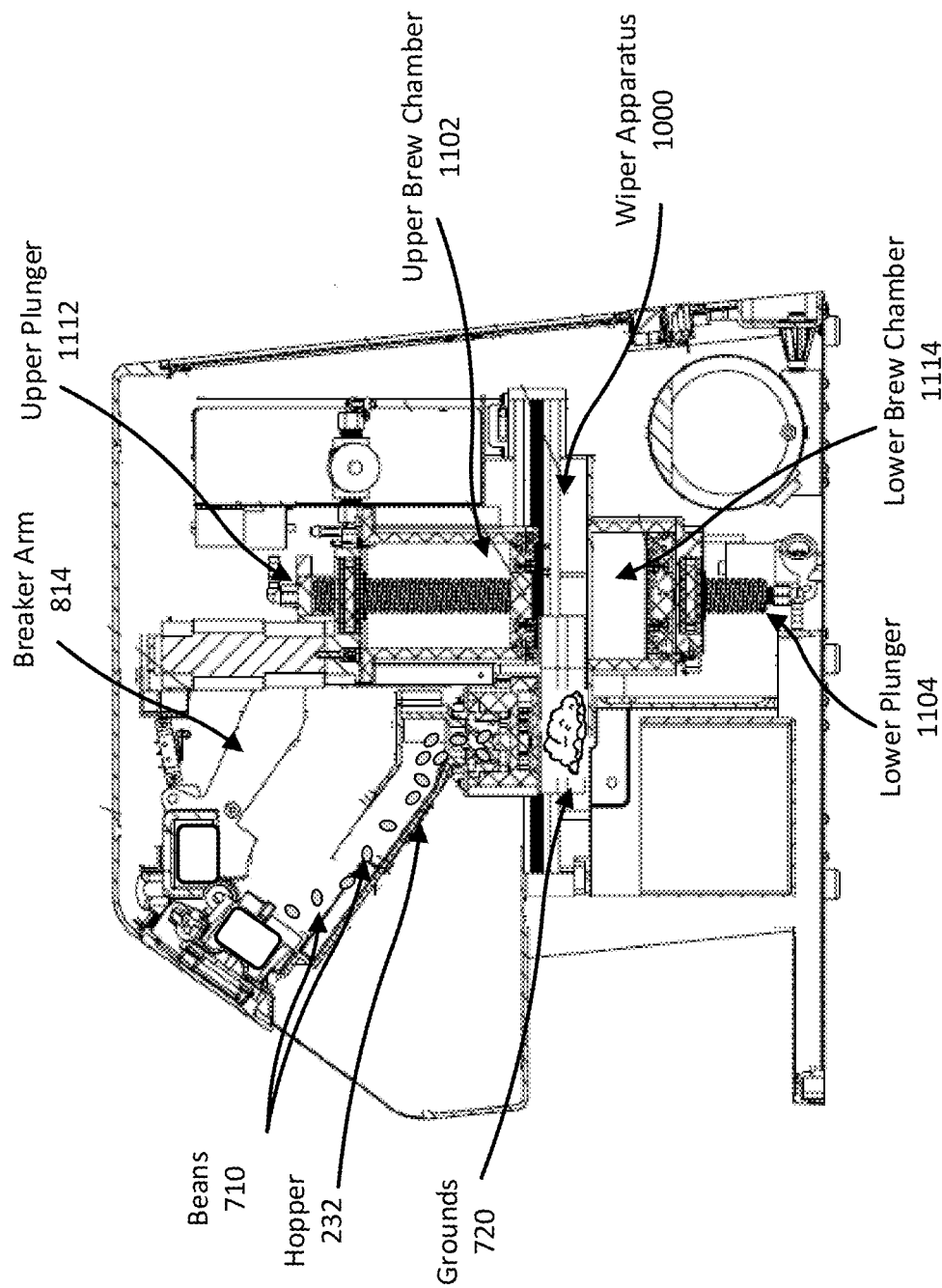

Visualizing this in FIG. 7E, the coffee beans move down the hopper and to the grinder 900. The grinder 900 grinds 614 the coffee beans 710 into coffee grounds 720 and the coffee grounds 720 are deposited on to the wiper apparatus 1000.

Step 4: Inserting Grounds

Returning to FIG. 6, once the beans have been ground 614, the beverage machine 100 inserts 616 the grounds into the lower brew chamber 1114. To insert 616 the grounds into the lower brew chamber 1114, the beverage machine 100 actuates the wiper apparatus 1000 to the out-state. Actuating the wiper apparatus 1000 moves the wiper slider 1020 across the wiper apparatus 1000 until the grounds 720 are slid into the lower brew chamber 1114. The wiper slider 1020 continues to move across the wiper apparatus 1000 until the wiper is in the out-state and the beverage machine 100 enters the seal brew chamber 618 step. If a predetermined amount of time elapses before the wiper reaches the out state, the beverage machine 100 enters maintenance mode.

Figure 7F:
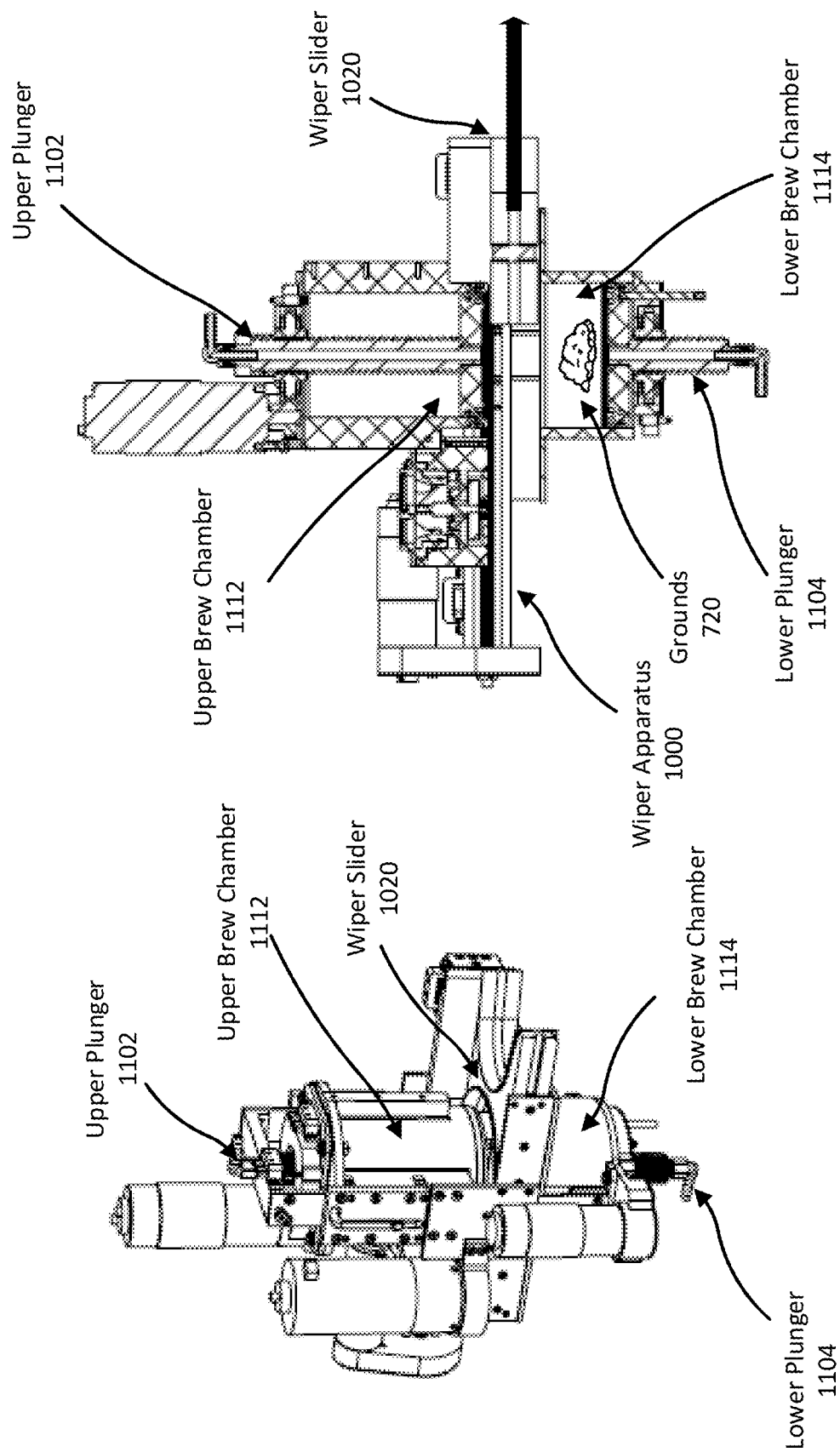

Visualizing this in FIG. 7F, the coffee grounds are slid across the wiper apparatus 1000 by the wiper slider 1020 and are deposited into the lower brew chamber 1114. The wiper slider 1020 continues moving past the brewer 1100 to the out-state.

Step 5: Seal Brew Chamber

Returning to FIG. 6, once the grounds have been inserted 616 into the lower brew chamber 1114 by the wiper apparatus 1000 and the wiper slider 1020 is in the 'out-position,' the beverage machine 100 seals 618 the brew chamber 1110. To seal the brew chamber 1110, the beverage machine 100 actuates the lower plunger 1104 to bring the lower brew chamber 1114 into the direct contact with the upper brew chamber 1112. The direct contact creates a fluid tight seal that allows for brewing of the grounds 720 without allowing fluid to exit the brew chamber 1110. Optionally, the beverage machine 100 actuates the upper plunger 1102 to raise the upper plunger 1102 and configures a larger volume within the brewer 1100 for brewing the grounds 720 into a beverage. Once the brew chamber 1110 has been sealed 618 and configured by the beverage machine 100, the beverage machine 100 enters the fill chamber 620 step. If a predetermined amount of time elapses before the upper plunger 1102 reaches the 'up-position,' or the lower plunger 1104 reaches the 'up-position' the beverage machine 100 enters maintenance mode.

Figure 7G:
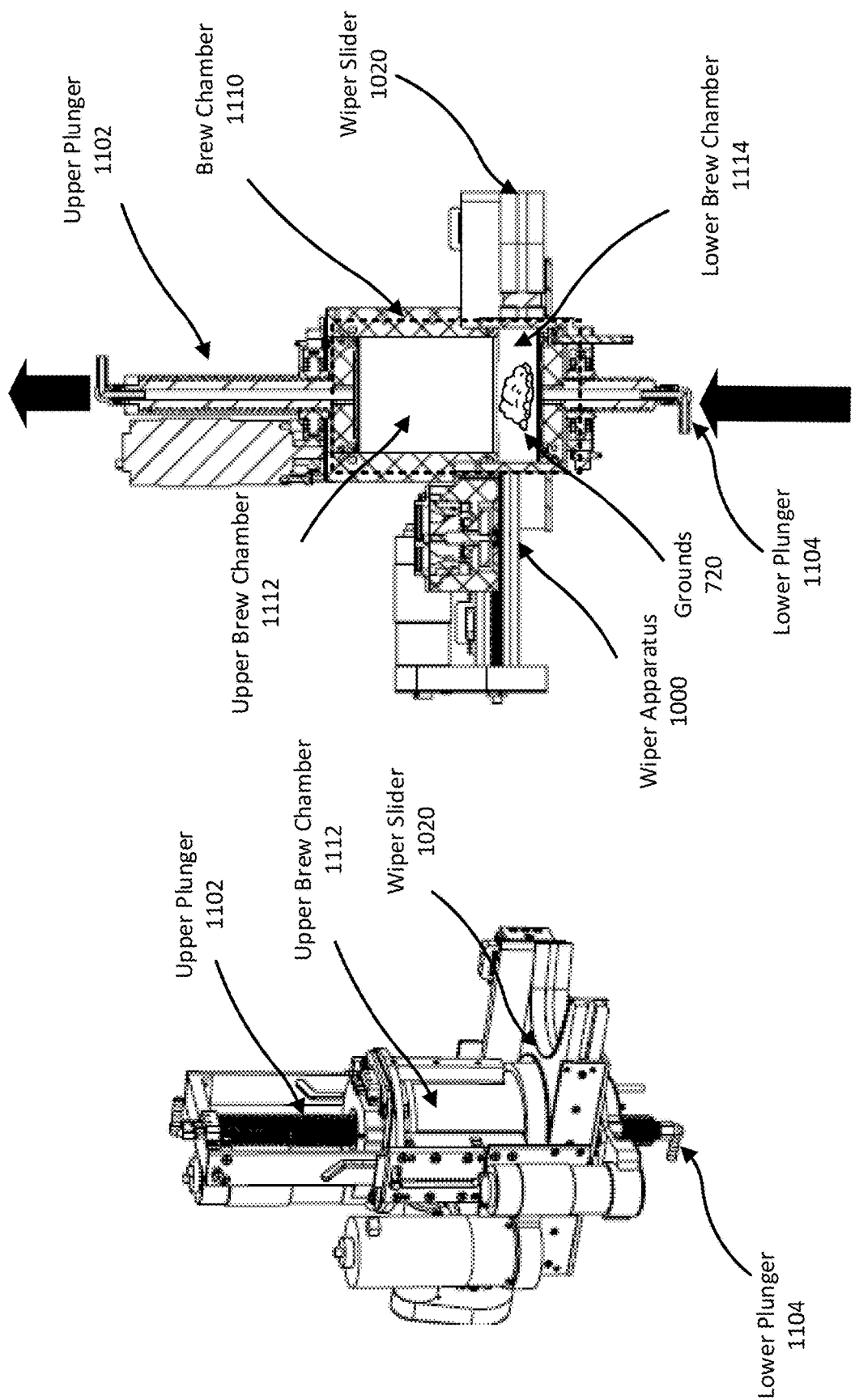

Visualizing this in FIG. 7G, lower brew chamber 1114 is lifted by the lower plunger 1104 to the upper brew chamber 1112 and the two are sealed to form the brewer 1110 for brewing the beverage. The upper plunger 1102 moves upwards to create a larger volume brewer 1100. Note that the coffee grounds 720 are raised with the lower brew chamber 1114 such that they are sealed in the brew chamber 1110 once the upper brew chamber 1112 and lower brew chamber 1114 are sealed as one.

Step 6: Fill Chamber

Returning to FIG. 6, after the brew chamber 1110 has been sealed 618 and configured, the beverage machine 100 fills 620 the brew chamber 1110. To fill 620 the brew chamber 1110, the beverage machine 100 energizes the appropriate solenoids 420 such that their corresponding valves allows water to enter the brew chamber. The beverage machine 100 continues to energize these solenoids 420 such that water fills the brew chamber 1110 based on brewing instructions. The beverage machine 100 determines the volume entering the brew chamber based on a signal from a flow meter. Using the signal from the flow meter, the beverage machine 100 also determine the flow rate of water into the brew chamber 1110. If the flow rate is below a predefined expected rate, the beverage machine 100 enters maintenance mode. When volume of water that has entered the brew chamber 1110 reaches the volume associated with the brewing instructions, the beverage machine 100 de-energizes the appropriate solenoids 420 such that water stops entering the brew chamber 1110. After the water input has ceased, the beverage machine 100 enters the brewing step 662. Filling the brew chamber 1110 is described in more detail in Section II.B Fluidic.

Figure 7H:
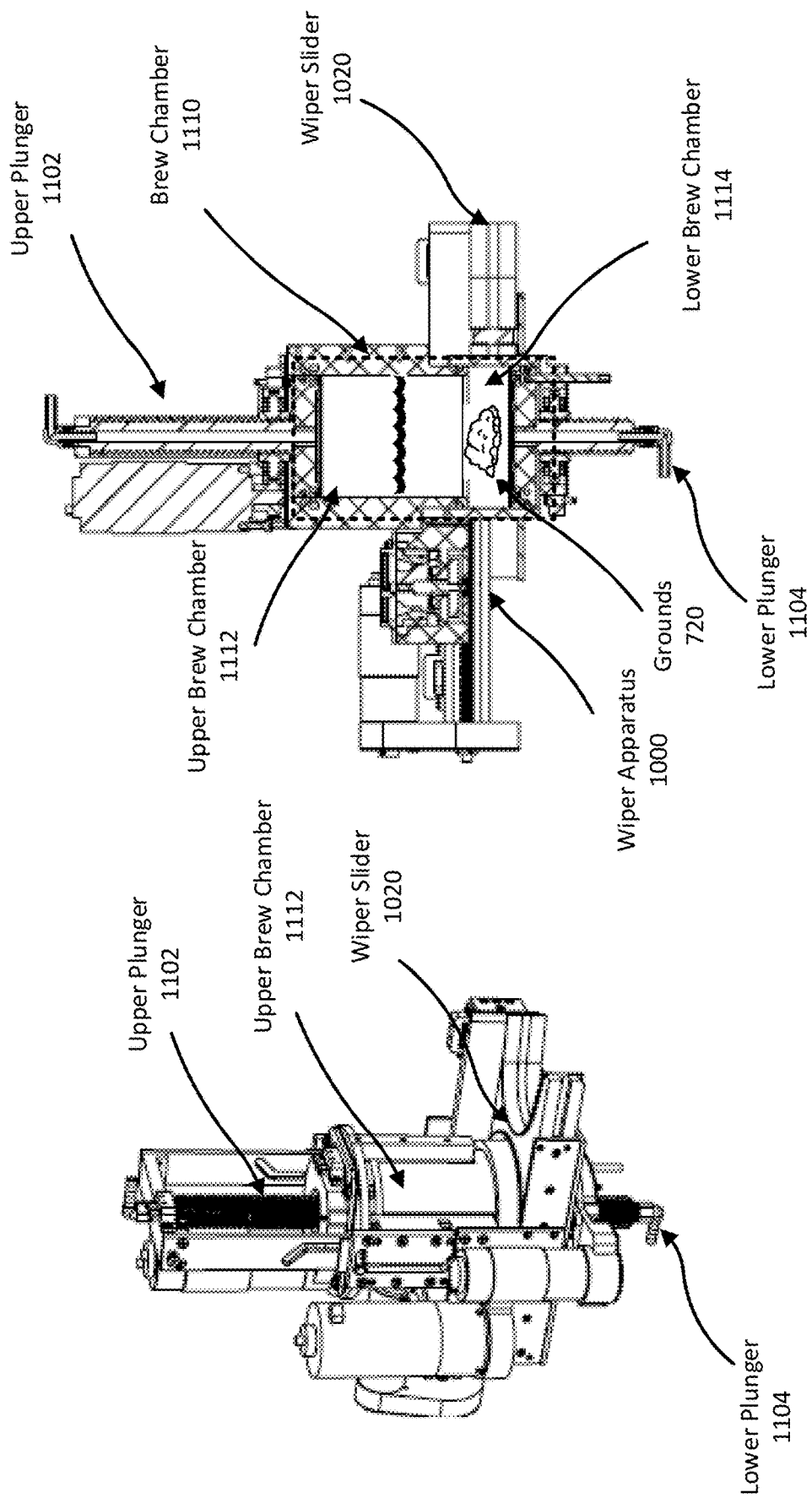
Figure 71:
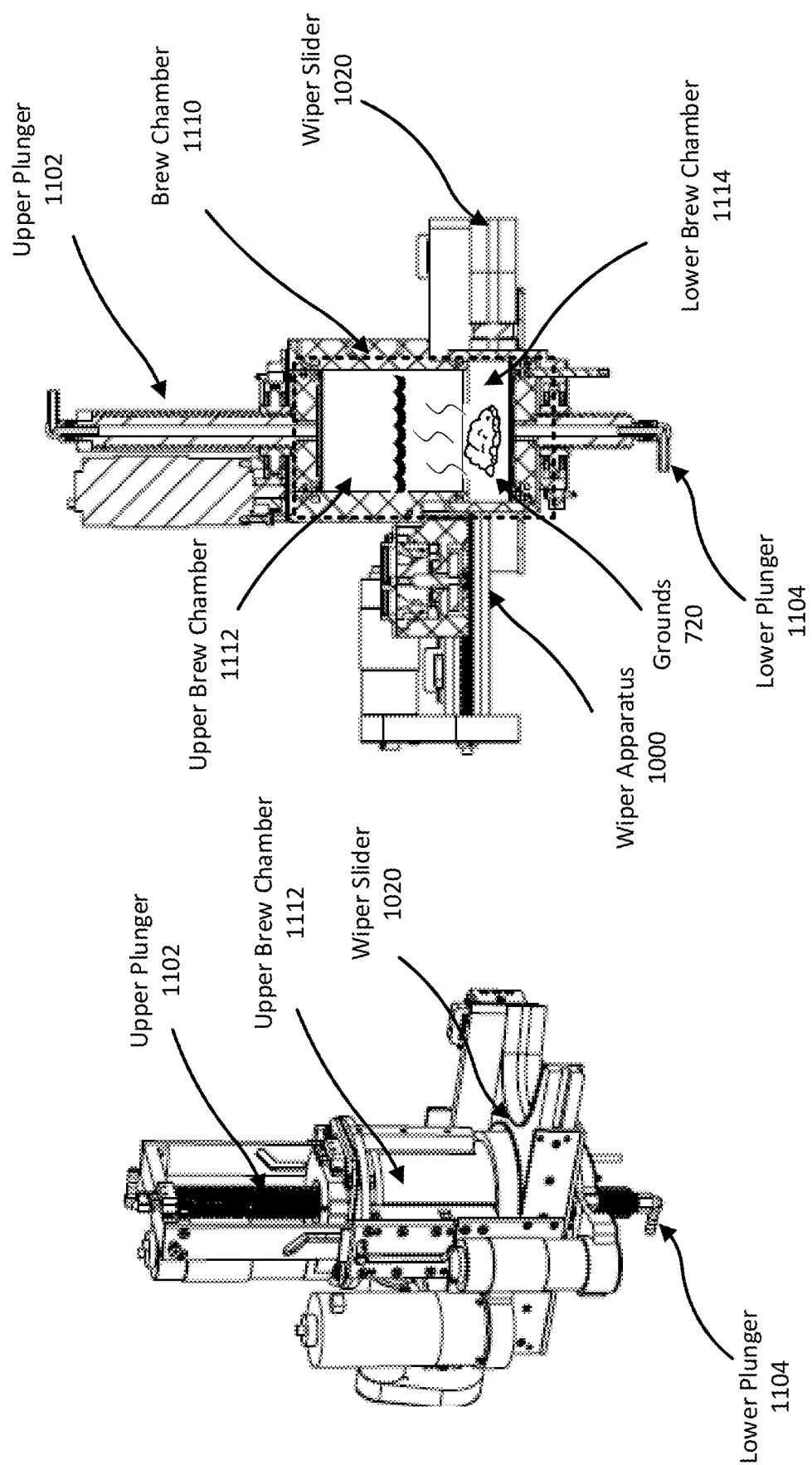

Visualizing this in FIG. 7H, the brew chamber 1100 is filled with water from the boiler to cover the grounds 720.

Step 7: Brewing

Returning to FIG. 6, after the brew chamber 1110 has been filled 620, the beverage machine 100 brews 622 the beverage. To brew 622 the beverage, the beverage machine 100 starts the main brewing timer and runs the brew program prescribed in the brew instructions. That is the beverage machine brews 622 the beverage according to information determined from the scanned barcode of the beverage pod 102 and associated with the specific coffee included in the beverage pod 102. The agitation of the beverage while brewing is accomplished by energizing the appropriate pumps and solenoids 420 to allow air to agitate the brewing coffee in the brew chamber. At a predetermined elapsed time associated with the scanned barcode of the beverage pod 102, the beverage machine 100 purges the brew chamber volume, i.e. dispensing 624 the beverage into the cup 730.

Visualizing this in FIG. 7I, the brew chamber 1110 brews the grounds in the water that fills the brewer 1100 such that they create the beverage.

Step 8: Dispense Liquid

Returning to FIG. 6, to dispense 624 liquid into the cup, the beverage machine 100 energizes the appropriate solenoids 420. Energizing these solenoids 420 allows the brewed coffee to exit the brewer 1100 and enter the coffee cup 730 external to the beverage machine 100 via the liquid outlet 254. In one configuration, the beverage machine 100 assists the coffee out of the brew chamber by adding air pressure at the top of the brew chamber 1110. The brew chamber 11100 is fluidically coupled to the coffee outlet 254 by tubes such that when purging the brew chamber 1110, the coffee enters the coffee cup using gravity and air pressure at the top of the brew chamber 11100. This process is described in more detail in Section II.B Fluidic. After the coffee has been dispensed 350, the brew chamber enters the open brew chamber 626 step.

At any point during the brewing process 550 the beverage machine inputs water into the boiler 250 and start warming the water that fills 620 the brew chamber 1110. The boiler 250 heats the water to a temperature that is used to brew 622 the beverage.

Figure 7J:
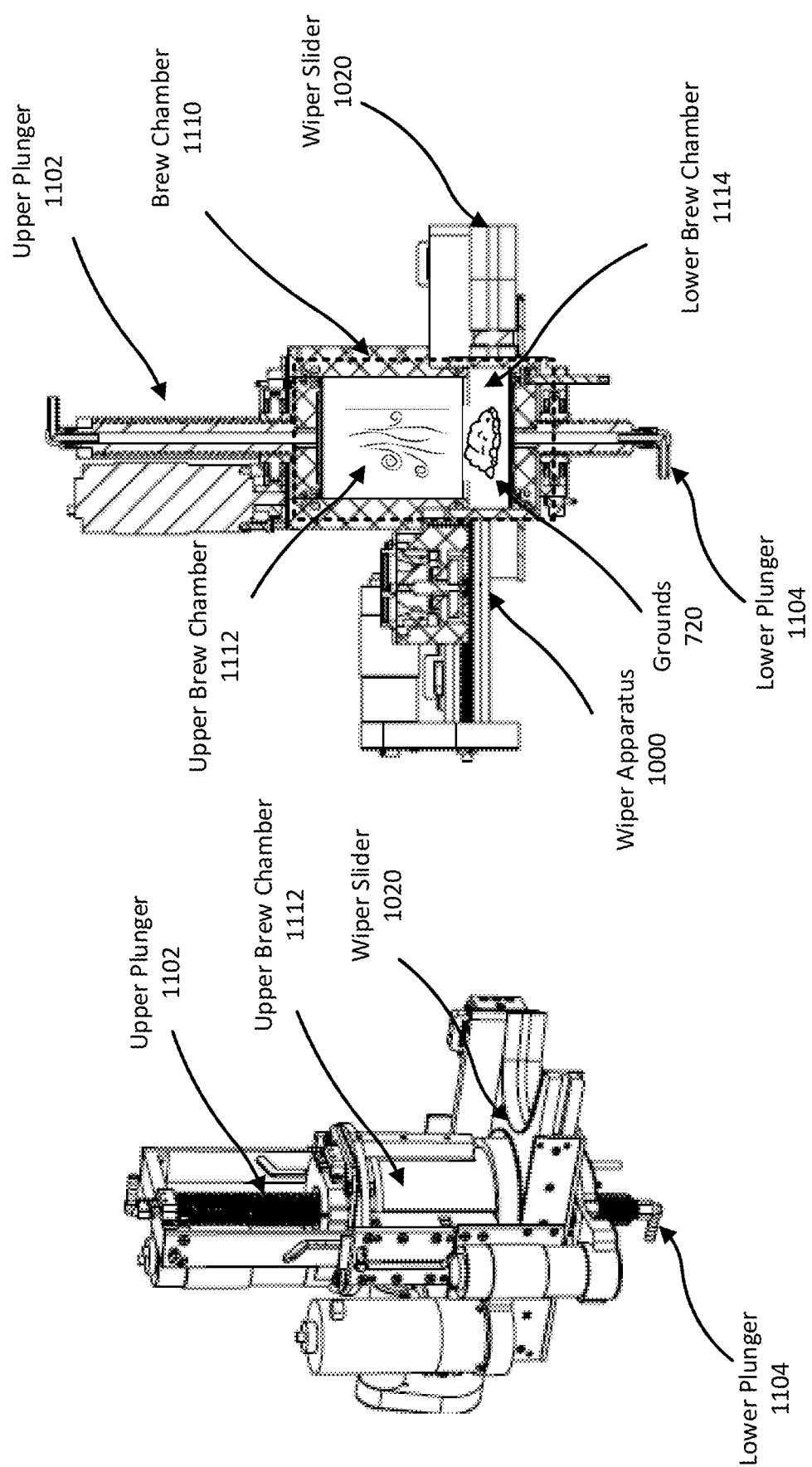
Figure 7K:
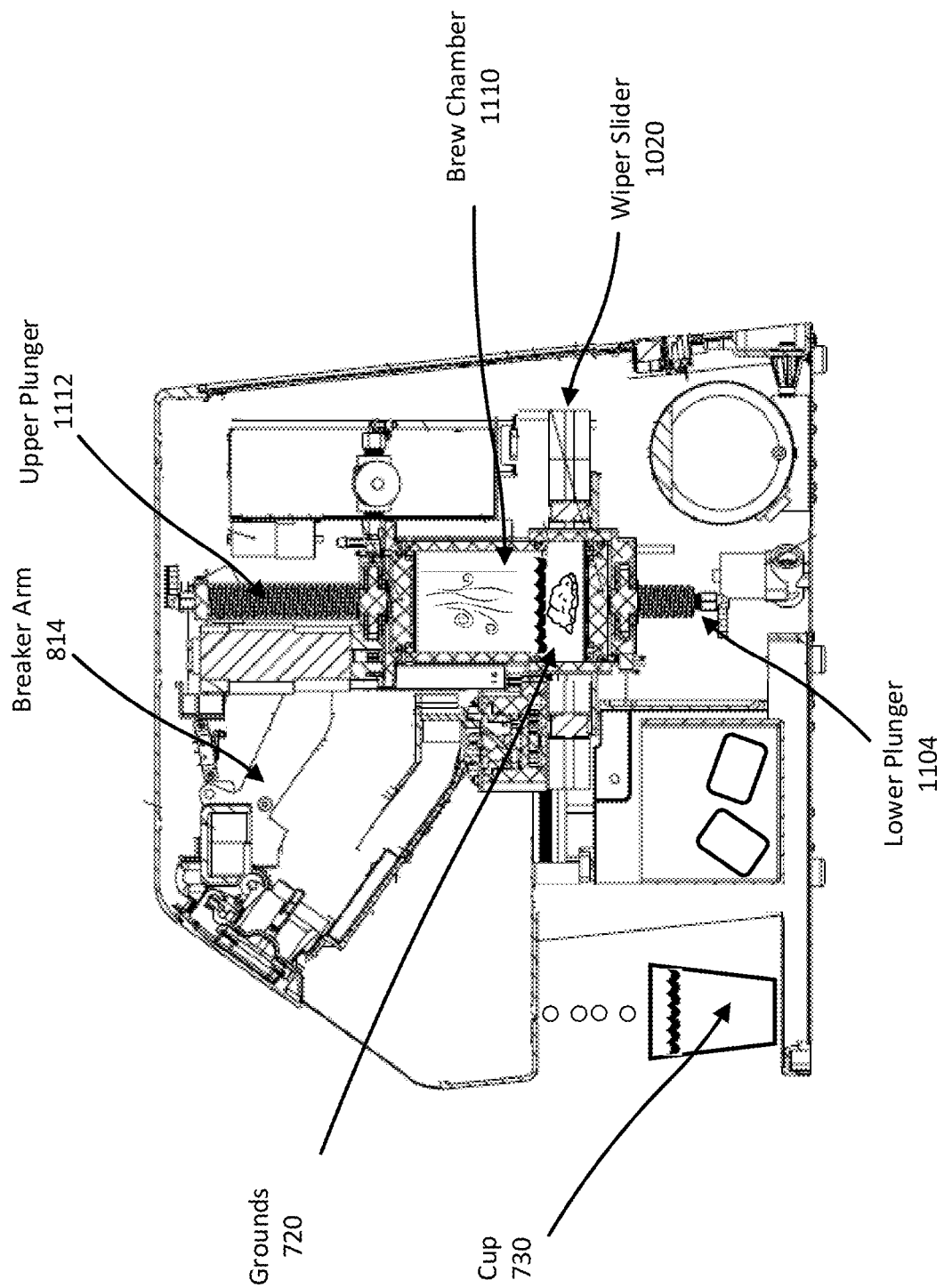

Visualizing this in FIGS. 7J and 7K, the brewer 1100 dispenses the brewed beverage into a copy cup 730 via the liquid outlet. In the illustrated embodiment, the brew chamber 1110 is pressured with air to assist the brewed beverage to exit the brew chamber 1110. Alternatively, gravity can also allow the beverage to exit the brew chamber.

Step 9: Open Brew Chamber

Returning to FIG. 6, after the beverage machine 100 dispenses 624 the beverage the beverage machine 100 opens 626 the brew chamber 1110. To open 626 the brew chamber 1110 the beverage machine 100 actuates the upper plunger 1102 to the 'down-state' to move the upper brew chamber 1112 to the down-position. After the upper brew chamber 1102 has reached the down position 224, the beverage machine 100 actuates the lower plunger 1104 (generally, by moving the plunger towards the down-state) such that the fluid tight seal is broken. Once the brewer 1100 has been opened, the beverage machine 100 enters the raise lower plunger step. If a predetermined amount of time elapses before the upper plunger 1102 reaches the down position, the beverage machine 100 enters maintenance mode.

Step 10: Raise/Lower Plunger

After the brew chamber is opened 626 the beverage machine 100 raises the lower brew plunger 628. To raise 628 the lower brew plunger 228, the beverage machine 100 actuates the lower plunger 1104 such that the lower plunger 1104 rises to the remove-state and the lower brew chamber 1114 is flush with the wiper apparatus 1000. After the lower brew chamber 1114 is raised, the beverage machine 100 enters the dump grounds 390 step. If a predetermined amount of time elapses before the lower plunger 1104 reaches the up position, the beverage machine 100 enters maintenance mode.

Figure 7L:
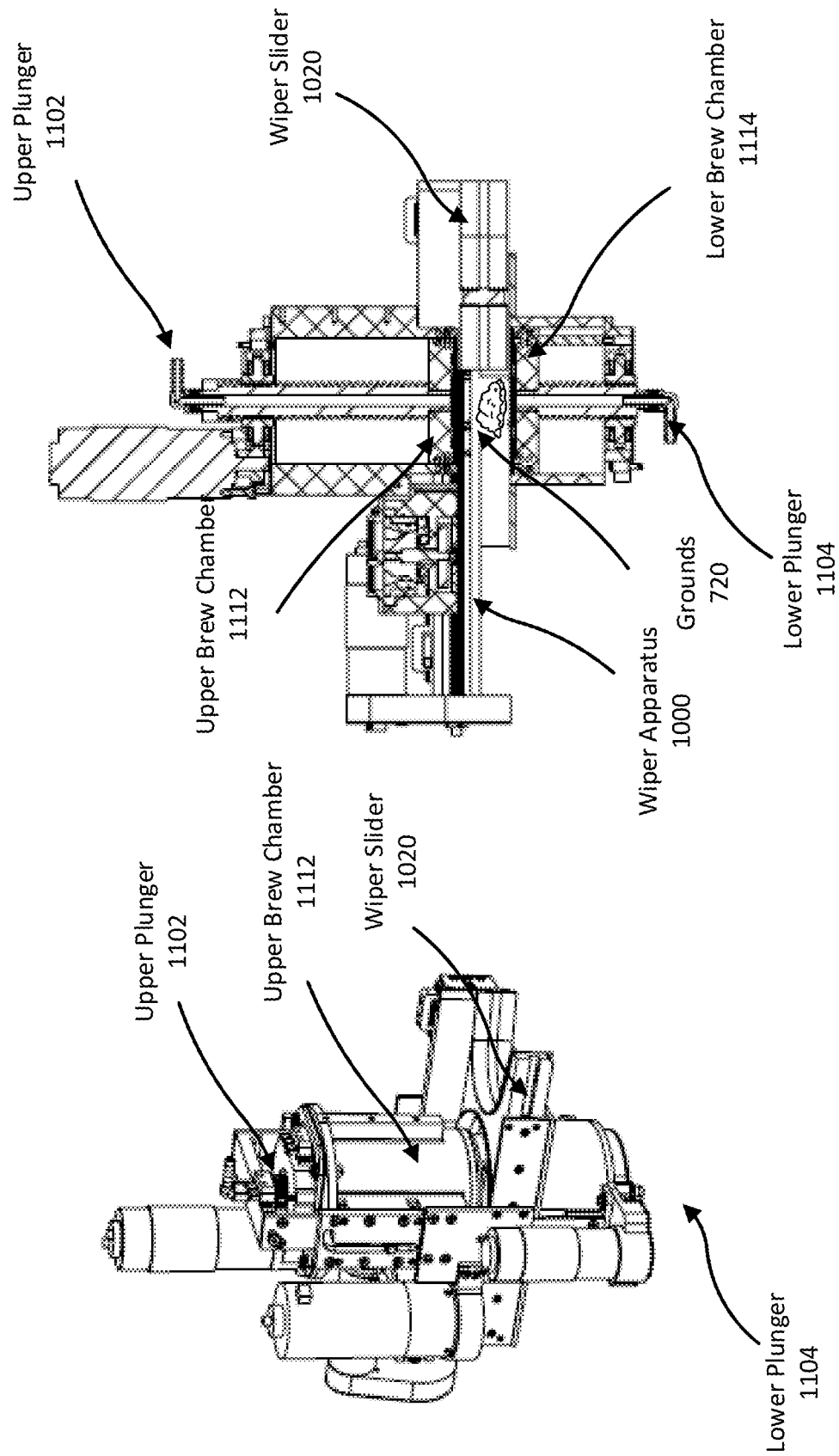
Figure 7M:
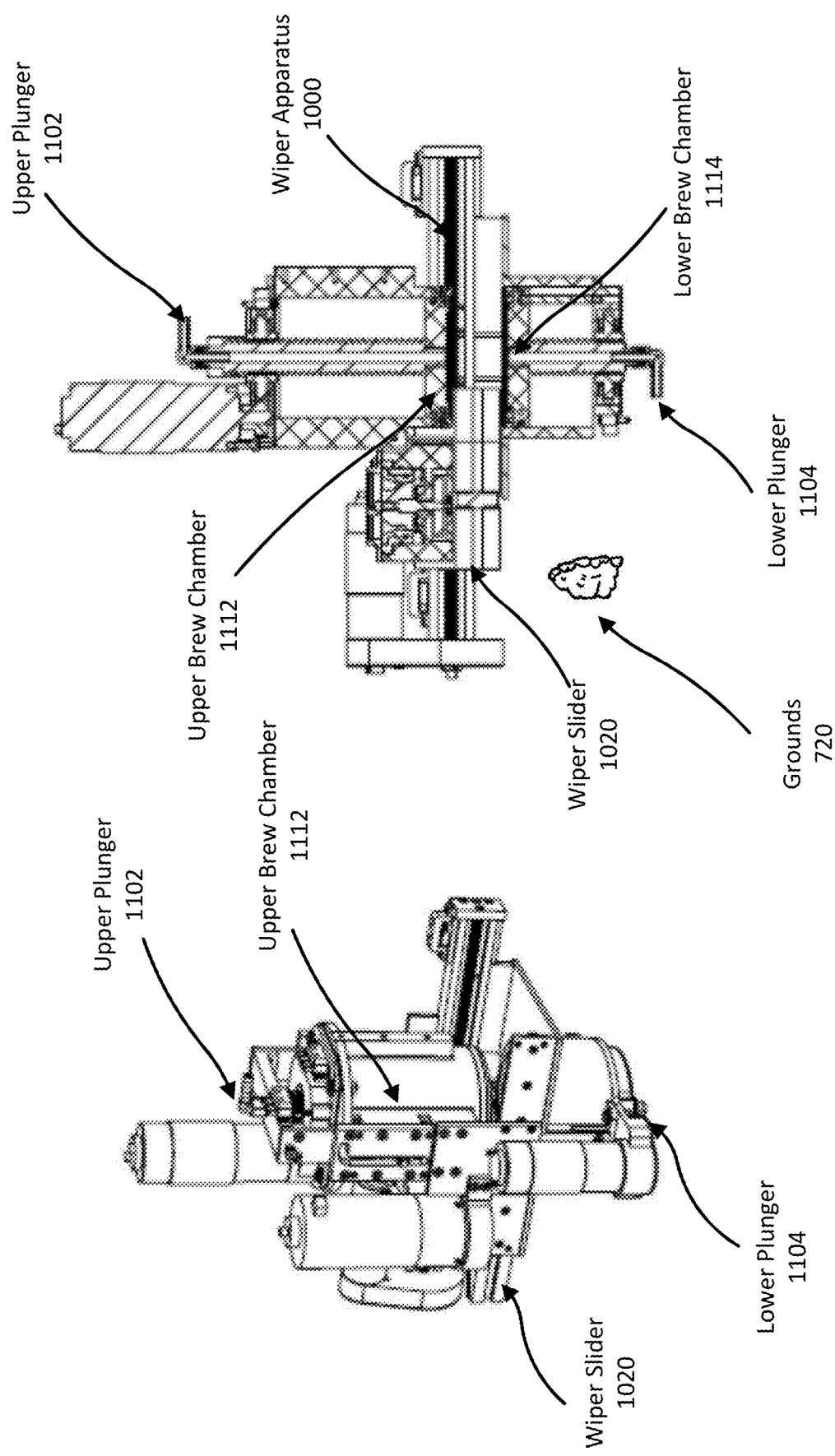
Figure 7N:
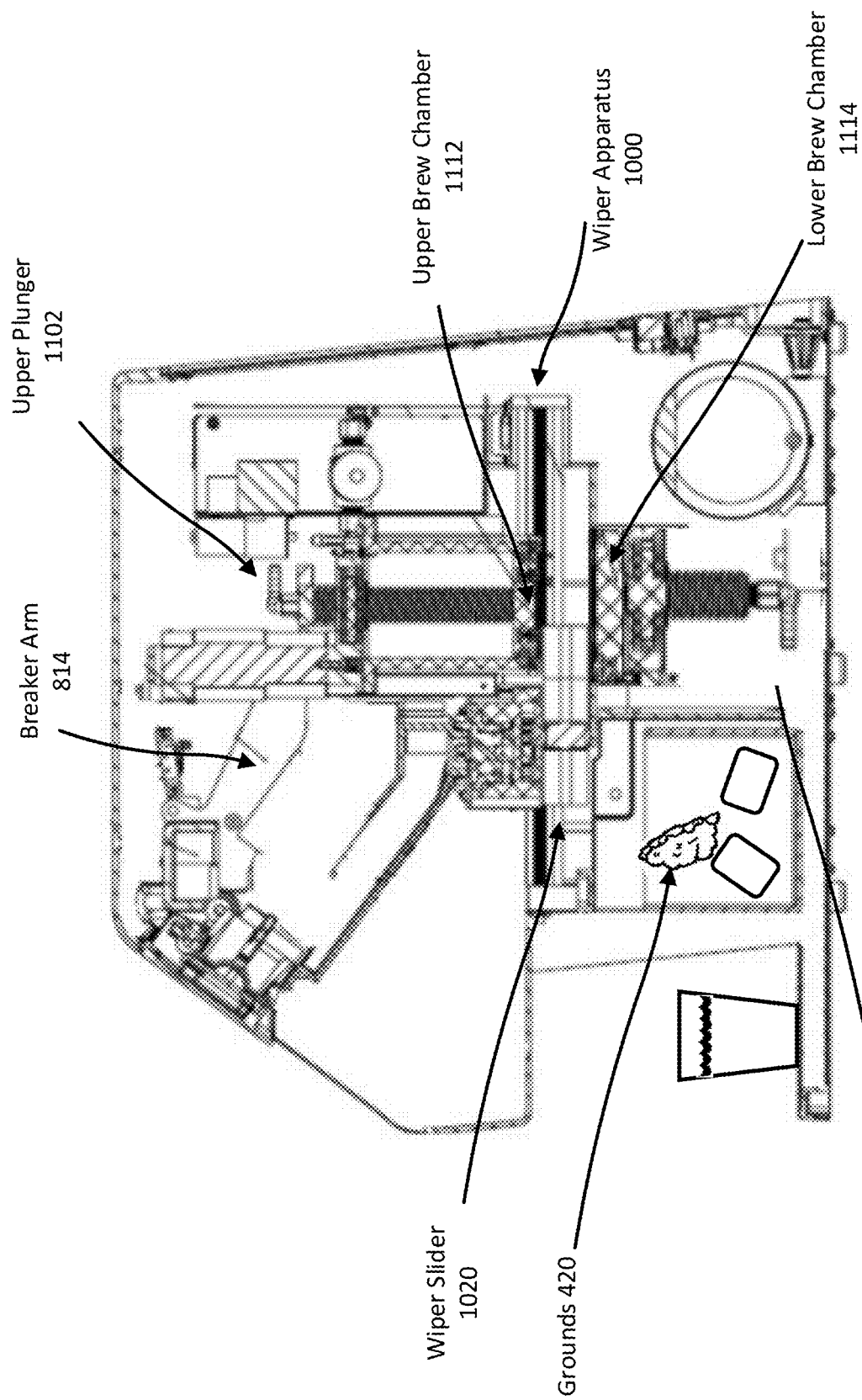

Steps 9-10 are visualized in FIG. 7L. The brew chamber 1110 is opened by lowering the upper plunger 11102 to the down-state and raising the lower plunger 11104 to the remove-state such that the lower plunger 1104 which is flush with the wiper apparatus 1100.

Step 11: Dump Grounds

Returning to FIG. 6, once the lower brew chamber is flush with the wiper apparatus 1000, the beverage machine 100 dumps 630 the remaining coffee grounds 720. To dump 630 the remaining coffee grounds, the beverage machine 100 actuates the wiper apparatus 1000 such that the wiper slider 1020 moves from the out-position to the in-position. As the wiper slider 1020 moves across the wiper apparatus 1000, the wiper slider 1020 moves the grounds 720 from the lower brew chamber 1014 to the compost bin 270. Once the wiper has moved the grounds to the compost bin 270, the beverage machine 100 enters the home machine 634 step. If a predetermined amount of time elapses before the wiper reaches the in-position, the beverage machine 100 enters maintenance mode.

Visualizing this in FIGS. 4M and 4N, the wiper apparatus 1000 moves the wiper slider 1020 from the out-state to the in-state and moves the used grounds from the wiper apparatus 1000 to the compost bin 270.

Step 12: Home System

Returning to FIG. 6, once the wiper slider 1020 is moved to the in-position and dumps 630 the grounds 720 into the compost bin 270, the beverage machine 100 homes 634 itself. The beverage machine 100 homes itself by moving elements of the beverage machine 100 into positions such that when the next brew process 550 is initiated by a user, no elements of the beverage machine 100 have to be moved before it can execute. To home 634 the beverage machine 100, the beverage machine 100 lowers actuates the lower brew chamber 1114 to the home position (generally down-position), and moves the wiper slider 1020 to the home position (generally in-position). In some configurations any or all of the elements may already be in the home position and may not require actuation. If a predetermined amount of time elapses before the lower plunger 1104 reaches the down position, the upper brew chamber 1112 position the up position, or the wiper slider 1020 reaches the in position, the beverage machine 100 enters maintenance mode.

The home position is visualized by returning to the configuration of the beverage machine in FIG. 7A, but with the door closed.

In some configurations, homing 634 the system can also include rinsing the brew chamber 1110. In one configuration, this occurs just after the dump grounds 630 step. Rinsing the brew chamber 1110 causes the beverage machine 1110 to actuate the upper brew chamber 1112 to the down position and the lower brew chamber 1114 to the up position to create the brew chamber 1110. The brew chamber 1110 is filled with water and then purged such that the brew chamber 1110 can be rinsed between subsequent brew processes. In some examples, rinsing the brew chamber 1110 occurs immediately after dumbing 630 the coffee grounds. After rinsing, the brew chamber is returned to the home position.

IIV. Machine Sub-Systems

Moving forward, internal components of the beverage machine 100 are described in more detail.

IIV.A Breaker

Figure 8A:
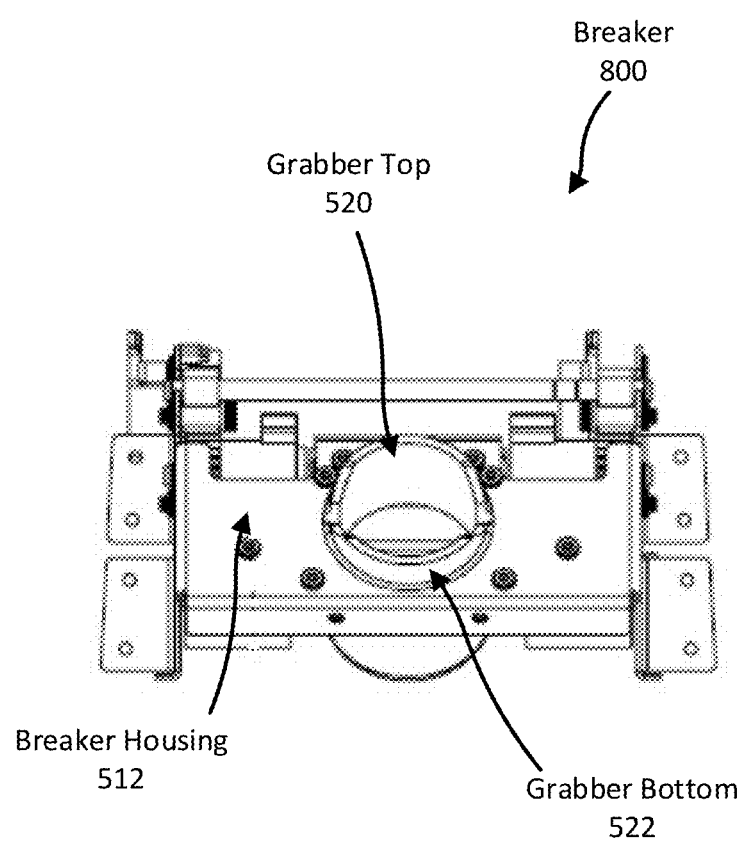
Figure 8B:
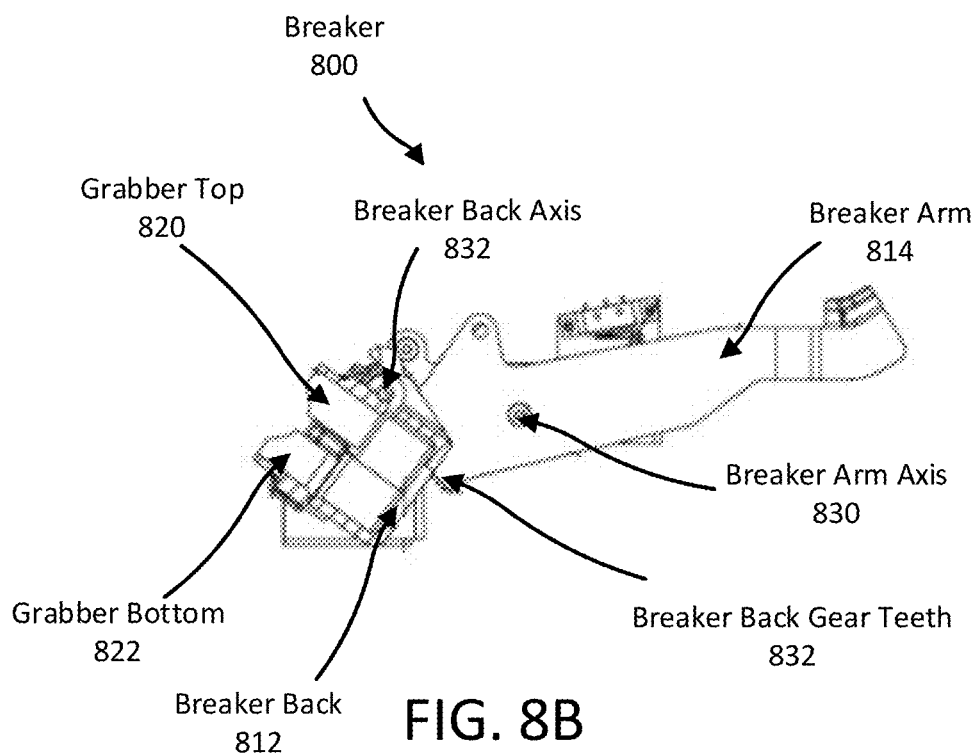
Figure 8C:
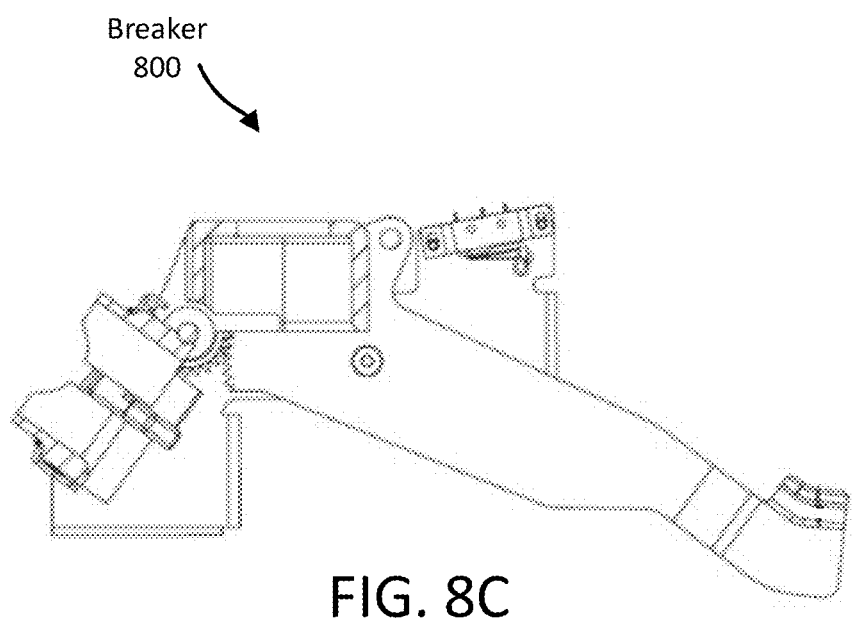

FIG. 8 is front-view illustration of the breaker 800 in a closed-state. FIG. 8B and FIG. 8C are side view illustrations of the breaker in a closed-state and an open-state, respectively. The breaker 800 includes a breaker housing 812 that couples all elements of the breaker 800 to one another and couples the breaker 800 to the housing 150 of the beverage machine 100.

The breaker 800 is configured such that a beverage pod can be inserted into the breaker 800 during the brewing process 550. The breaker 800 is further configured such that a grabber top 820 and a grabber bottom 822 securely hold the beverage pod 102 within the breaker 800 when the beverage pod 102 is inserted. When the beverage pod 102 is fully inserted into the breaker 800, the beverage pod 102 is proximal to the breaker back 812 such that the beverage pod 102 is scanned. Further, when the beverage pod 102 is inserted, the breaker back 812 holds one end of the beverage pod 102 and the breaker front holds the other with the grabber top 820 and the grabber bottom 822. A downward force is applied to the end of the breaker arm 814 farthest from the beverage pod 102 causing the arm to pivot on its fixed axis 830 during the brewing process 350. Gear teeth on the end of the breaker arm 814 engage with gear teeth 832 on the breaker back 812 causing the breaker back 812 to rotate on its fixed axis 832. This downward force moves a back portion of the beverage pod 102 with the breaker back 832 while a front portion of the beverage pod 102 is held stationary in the grabber arms 820 and 822. This results in a tensile force about the sidewall of the beverage pod 102 such that the beverage pod 102 tears/breaks/opens the sealing label on the beverage pod 102. The beverage pod 102 breaks into two portions allowing the whole elements (coffee beans) to be released into the hopper.

Additionally, the breaker can dispose of the beverage pod to the compost bin 270. When the breaker 800 is in the closed/accept pod, position, there are grabbers 820 and 822 that lay flush in the wall of the beverage pod 102 receiving area. As the breaker 800 moves into the open/pod break position, these arms are pivoted, causing a compression on the beverage pod 102 to hold it during the break, then pivoted further to expel the broken pod from the beverage pod 102 receiving area towards the compost bin 270. These grabbers 820 and 822 are actuated by a cam on the breaker back which interact with a cam surface on the top of the grabber arms.

IV.B Grinder

Figure 9A:
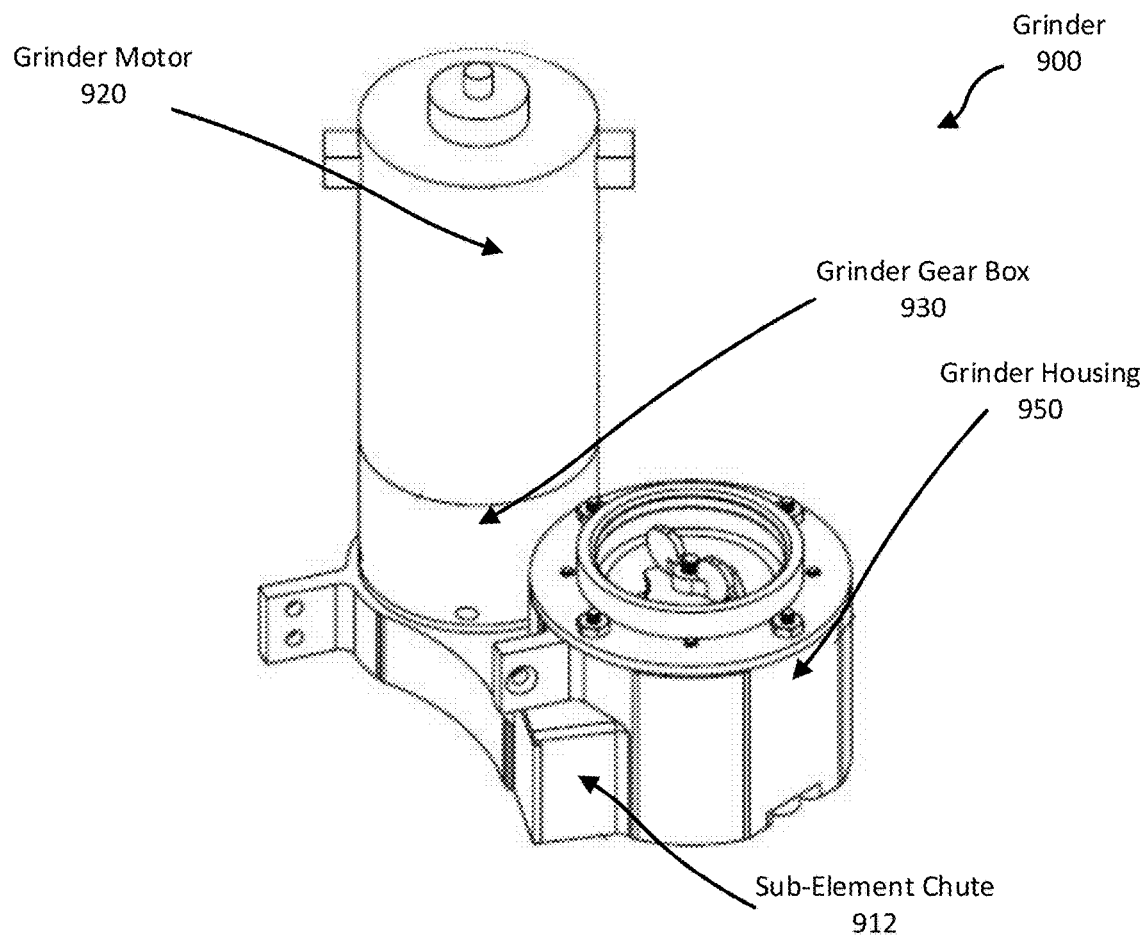
FIGS. 9A-9B illustrate the grinder, according to one example embodiment.
Figure 10A:
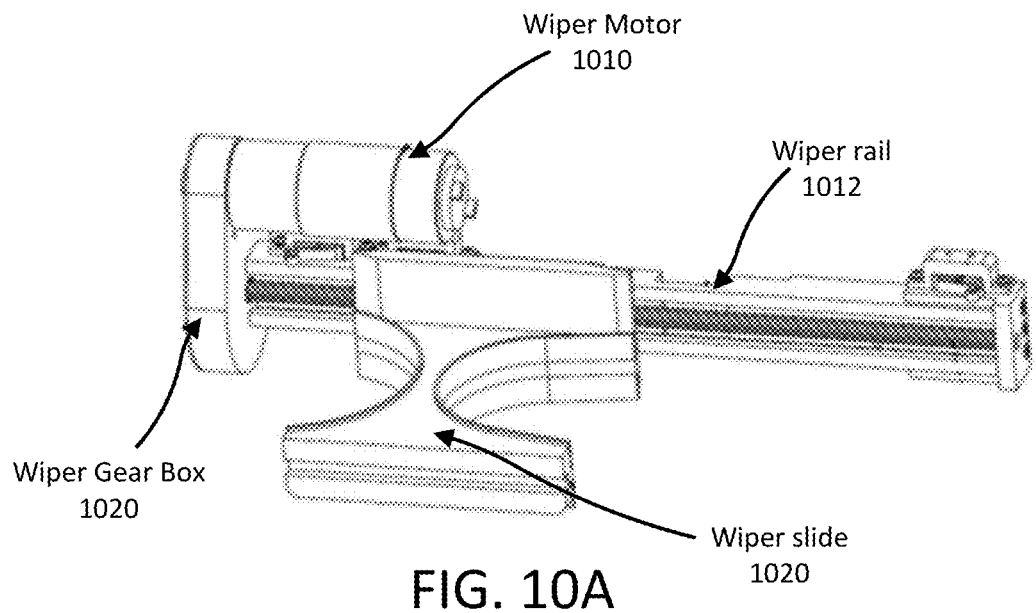
FIGS. 10A-10B illustrate the wiper, according to one example embodiment.
Figure 10B:
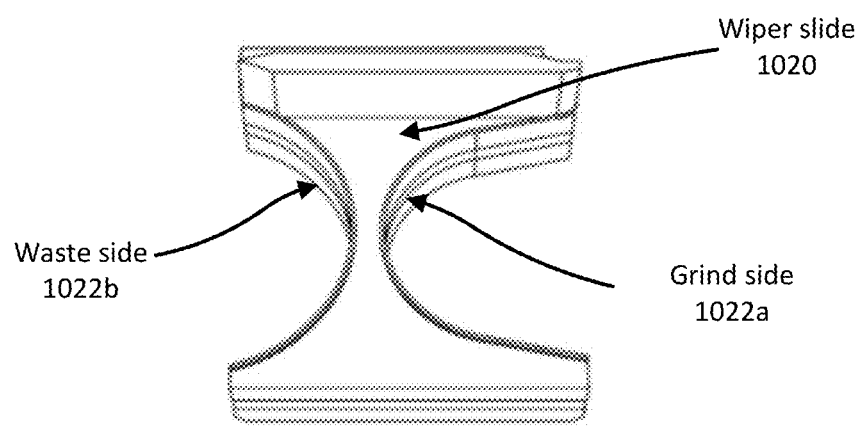

FIG. 9A is an isometric-view illustration of the grinder 900. The grinder 900 includes a grinder motor 920, a grinder gear box 930, a sub-element chute 912, and a grinder housing 950. The grinder motor 920 is coupled to the grinder gear box 930 and the grinder gear box 930 is coupled to the grinder housing 950 such that the grinder motor 920 actuates gears within the grinder gear box 930 and grinder housing 950. The grinder housing 950 is coupled to the hopper 232 such that elements from inside the beverage pod 102 (e.g. coffee beans) move from the beverage pod 102 to the grinder housing 950 when the beverage pod 102 is opened by the breaker 800.

Figure 9B:
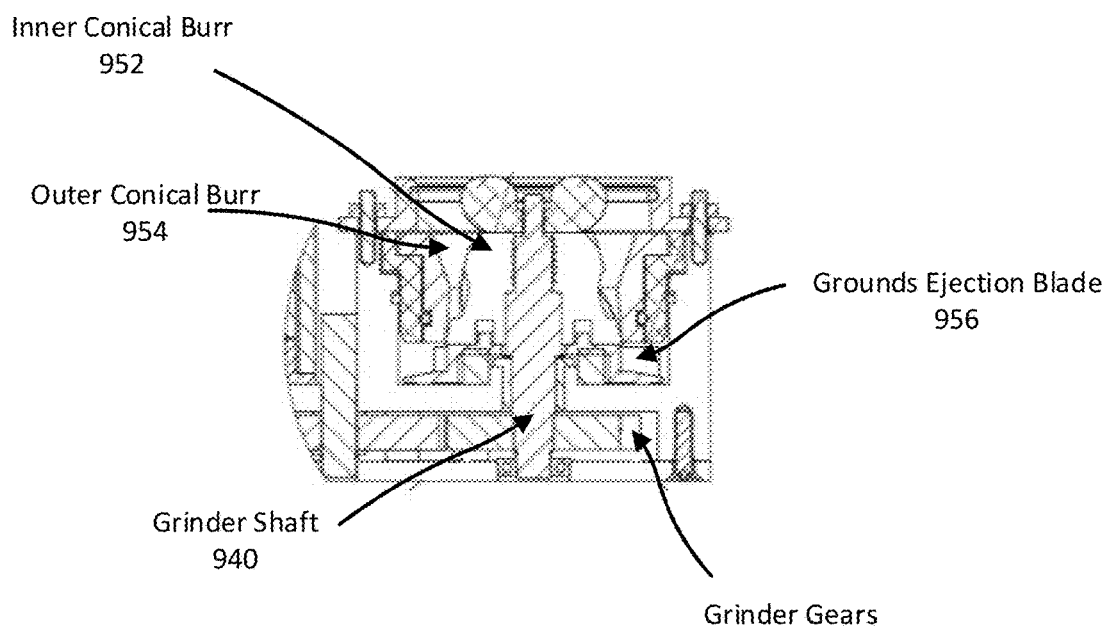

FIG. 9B is a cross sectional view of the grinder housing 950. The grinder housing includes grinder gears 932, a grinder shaft 940, an outer conical burr 952, an inner conical burr 954 and a ground ejection blade 956. The grinder gears 932 are coupled to the grinder gear box. The grinder motor 920 actuates the grinder gear box 930 such that the grinder gears 932 within the grinder housing 950 rotate. The grinder gears 932 rotate the inner conical burr 952 and outer conical burr 954 about the grinder shaft 940 such that the elements (e.g. coffee beans) are ground into sub-elements within the grinder housing 950. The grinder gears 932 additionally rotate the grounds ejection blade 956 about the grinder shaft 940 such that sub-elements (e.g. coffee grounds) are moved into the sub-element chute. The sub-element chute 912 is coupled to the wiper apparatus 1000 such that when the sub-elements exit the sub-element chute 912 they sub-elements are transferred to the wiper apparatus 1000. In some configurations, the grinder 900 can actuate the inner conical burr 952 or outer conical burr 954 to different position to change the size of the resulting sub-elements. The position of the burrs can be defined in the brew instructions determined from the beverage pod.

In one embodiment, the grinder includes a bypass hopper. The bypass hopper coupling the breaker directly to the wiper apparatus. The bypass hopper allows whole elements to be brewed without being ground.

IV.C Wiper

FIG. 7A is an isometric-view illustration of the wiper apparatus 1000. The wiper apparatus includes a wiper gear box 1020, a wiper motor 1010, a wiper linear rail 1012, and a dual sided wiper slider 1020. The wiper motor 1010 is coupled to the wiper gear box 1020 such that the wiper motor actuates the wiper gear box. In another configuration, the wiper apparatus 1000 is mechanically coupled to the breaker arm such that when the breaker arm 814 is actuated, the wiper is actuated. When actuated, the wiper gear box 1020 moves the wiper slider 1020 along the wiper rail 1010. Additionally the wiper apparatus 1000 includes position switches to indicate when the wiper is in the in-state or out-state when the wiper slider is moved in to a position to actuate the switch.

FIG. 7B is an illustration of the dual sided wiper slider 1020. The wiper slider 1020 has a grounds side 1022a and a waste side 1022b. The wiper slider 1020 is coupled to the wiper rail 1010 such that when the wiper slider moves sub-elements from the grinder 900 to the lower brew chamber with the grounds side 1022a and moves sub-elements from the brewer 1100 to the compost bin 1022b with the waste side.

Generally the wiper apparatus 1000 also includes a wiper platform. The wiper platform is a mechanical element which lies flush with the bottom side of the wiper slider 1020 such that when the grounds are moved about the wiper apparatus, all of the grounds are moved in the desired manner (e.g. into the brew chamber, or into the compost bin).

IV.D Brewer

Figure 11A:
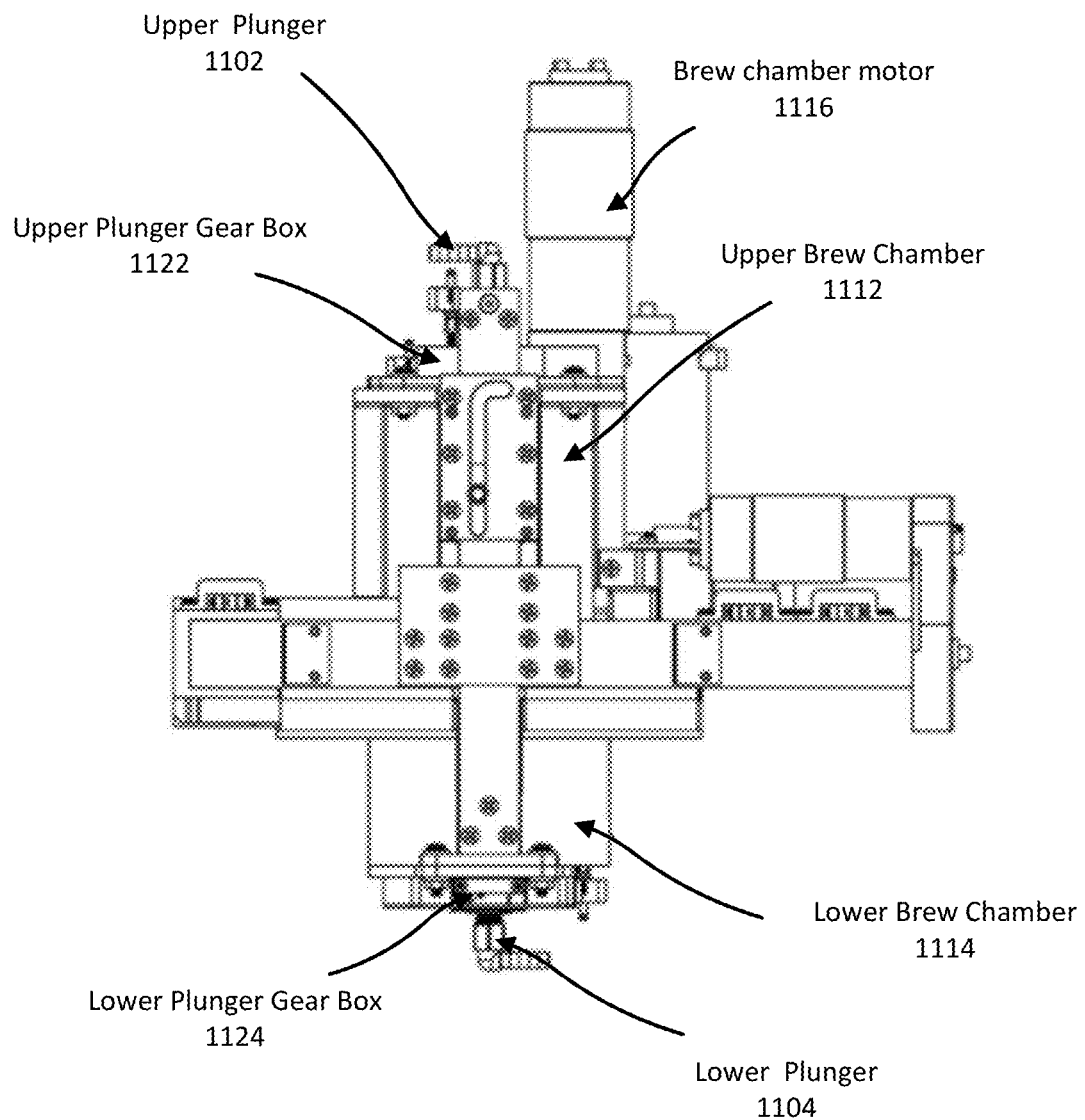
FIGS. 11A-11D illustrate the brew chamber, according to one example embodiment.

FIG. 11A is an illustration of the brewer 1100. The brewer 1100 includes a lower brew chamber 1114, a lower plunger 1104, an upper plunger 1102, an upper brew chamber 1112, an upper plunger gear box 1122, a lower plunger gear box 1124, and a brew chamber motor 1116. The brew chamber motor 1116 is coupled to the lower plunger gear box 1112 and the upper plunger gear box 1122 such that the brew chamber motor 1116 actuates the lower plunger gear box 1124 and upper plunger gear box 1122. The lower plunger gear box 1124 moves the lower plunger 1104 when actuated, and, similarly, the upper plunger gear box 1122 moves the upper plunger 1102 when actuated.

The upper brew chamber 1112 is a cylindrical vessel with the outer edge of upper plunger 1102 coupled to the inner edge of the upper brew chamber 1112 such that the coupled edges form a water tight seal. The upper plunger 1102 is moved within the upper brew chamber 1112 by the brew chamber motor 1116 and upper plunger gear box 1122, i.e. to the up-state or down-state, to configure the volume of upper brew chamber 1112 to different sizes. In the up-position, the upper plunger 1102 has been moved to the up-state. The up-position positions the upper plunger near the top side of the upper brew chamber 1112 to create a large volume upper brew chamber 1112. In the down-position, the upper plunger 1102 is moved downwards to the down-state. The down-state positions the upper plunger near the bottom side of the upper brew chamber 1112 to create a smaller volume upper brew chamber 1112.

The lower brew chamber 1114 is a cylindrical vessel with the outer edge of lower plunger 1104 coupled to the inner edge of the lower brew chamber 1114 such that the coupled edges form a watertight seal. The lower plunger 1104 is moved within the lower brew chamber, i.e. to the up-state or down-state, to configure the lower brew chamber 1114 to different sizes. In the up-position, the lower plunger 1104 is moved to the up-state. The up-position positions the lower plunger near the top side of the lower brew chamber (alternatively, near the bottom side of the upper brew chamber) and couples the lower brew chamber 1114 to the upper brew chamber 1112 and creates the brewer 1100 for brewing 350 the beverage. In the down-position, the lower plunger 1104 is moved downwards to the down-state. The down-position positions the lower plunger 1104 near the bottom side of the lower brew chamber 1114 to create an area for the sub-elements (e.g. coffee grounds) to be inserted into the lower brew chamber 1114. Additionally, the lower plunger is moved such that it is flush with the wiper apparatus 1000 and the sub-elements (e.g. coffee grounds) is moved from the lower brew chamber 1114 to the compost bin 270.

Figure 11B:
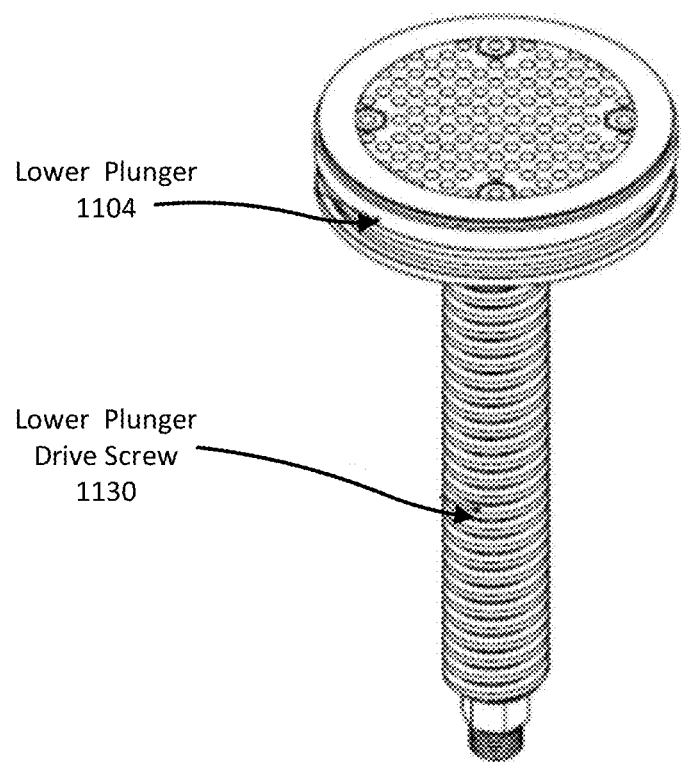
Figure 11C:
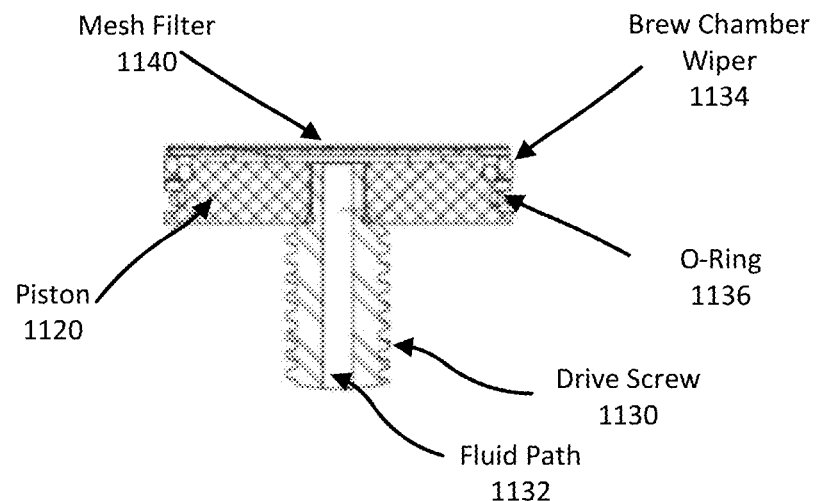

FIG. 11B is an illustration of the lower plunger 1104 and FIG. 11C is a cross sectional view of the lower plunger 1104. The lower plunger 1104 includes a piston 1120, a lower plunger drive screw 1130, a mesh filter 1140, a fluid path 1132, a brew chamber wiper 1134 and an O-ring seal 1136.

The piston 1120 is a cylindrical element whose outer surface is coupled to the inner surface of the lower brew chamber 1114 and upper brew chamber 1112. The top side of the piston 1120 is coupled to a mesh filter 1140. The mesh filter 1140 filters water as it enters the lower brew chamber 1114 or filters the beverage as it exits the lower brew chamber 1114. The bottom side of the piston 1120 is coupled to the lower plunger drive screw 1130. The lower plunger drive screw 1130 is coupled to the lower plunger gear box 1124 and brew chamber motor 1116 such that the brew chamber motor 1116 moves the piston within the upper 1112 and lower 1114 brew chambers. The lower plunger drive screw 1130 is hollow such that fluid moves into the lower brew chamber via the fluid path 1132. The outer surface of the piston 1120 includes a brew chamber wiper 1134 that wipes the inner surfaces of the brew chamber as the piston 1120 is moved within the brew chamber. The outer surface of the piston 1120 also includes an O-ring 1136, the O-ring 1136 creating a fluid tight seal between the outer surface of the piston 1120 and the inner surface of the lower brew chamber 1114.

The upper plunger 1102 is similarly configured to the lower plunger 1104 with the upper plunger outer surface of the upper plunger 1102 coupled to the inner surface of the upper brew chamber 1112.

Figure 11D:
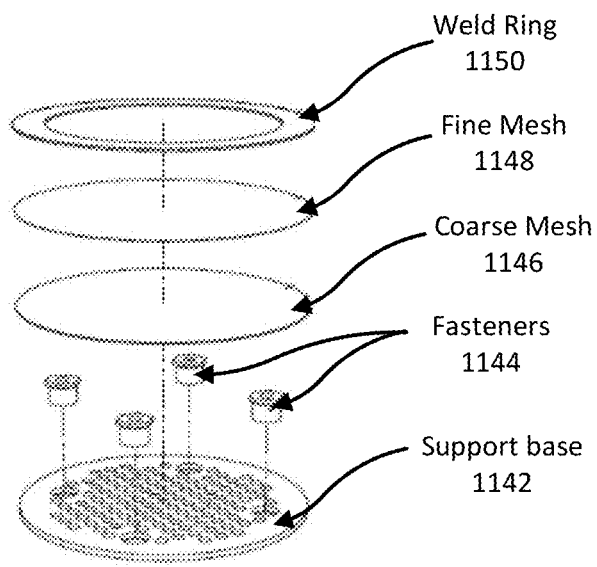

FIG. 11D is an illustration of the mesh filter 1140. The mesh filter includes a support base 1142, fasteners 1144, a coarse mesh 1146, a fine mesh 1148, and a weld ring 1150. The bottom side of the support base 1142 is coupled to the top side of the piston 1120 with the fasteners 1144. The bottom side of the coarse mesh 1146 is proximal to the top side of the support base 1142, the bottom side of the fine mesh 1148 is coupled to the top side of the coarse mesh 1146, and the weld ring 1150 is coupled to the top side of the fine mesh 1148. The weld ring 1150 fastens the coarse and fine mesh to the support base.

Figures 12A, 12B:
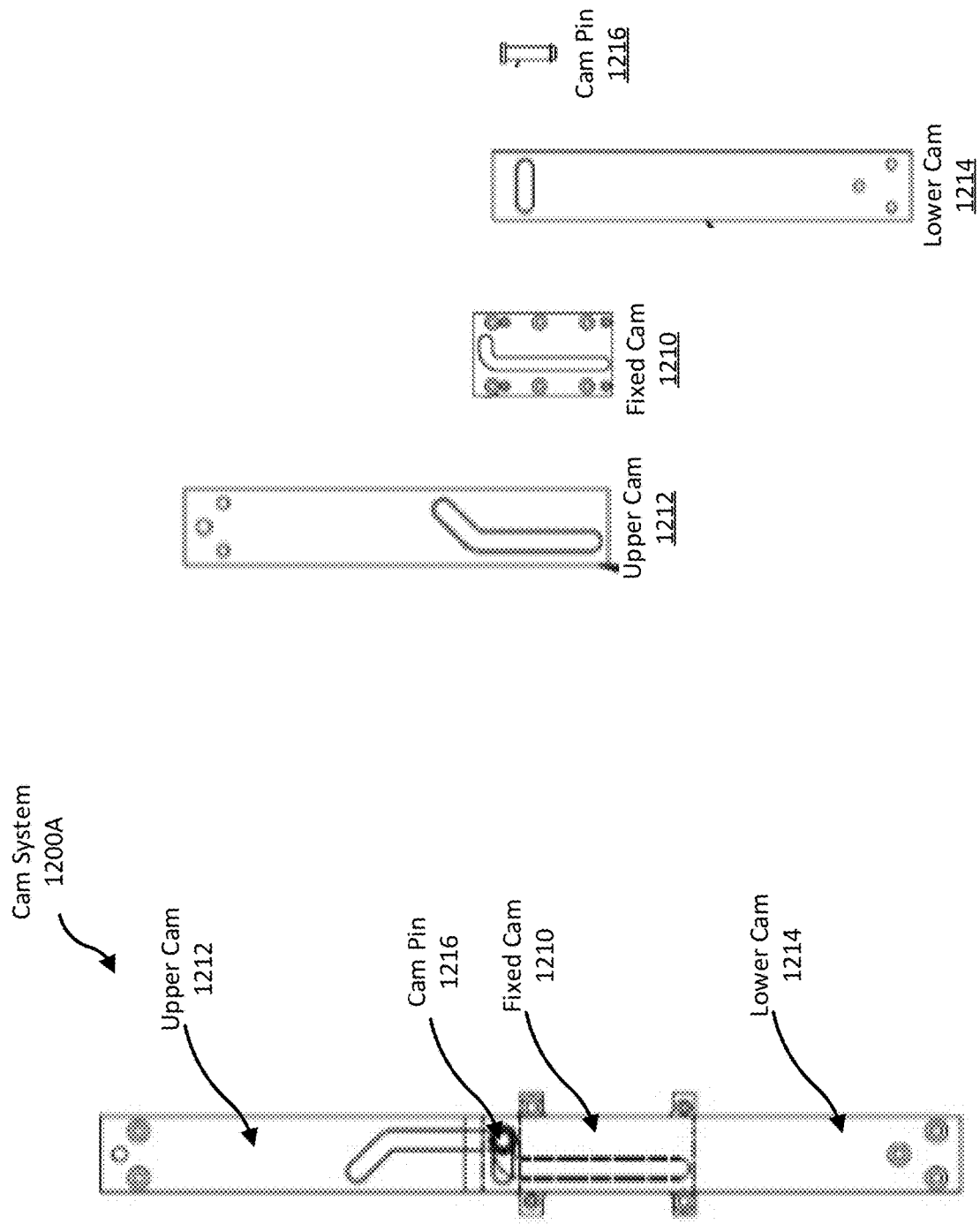
FIGS. 12A-12C illustrate a cam arm system of the brew chamber, according to one example embodiment.
Figure 12C:
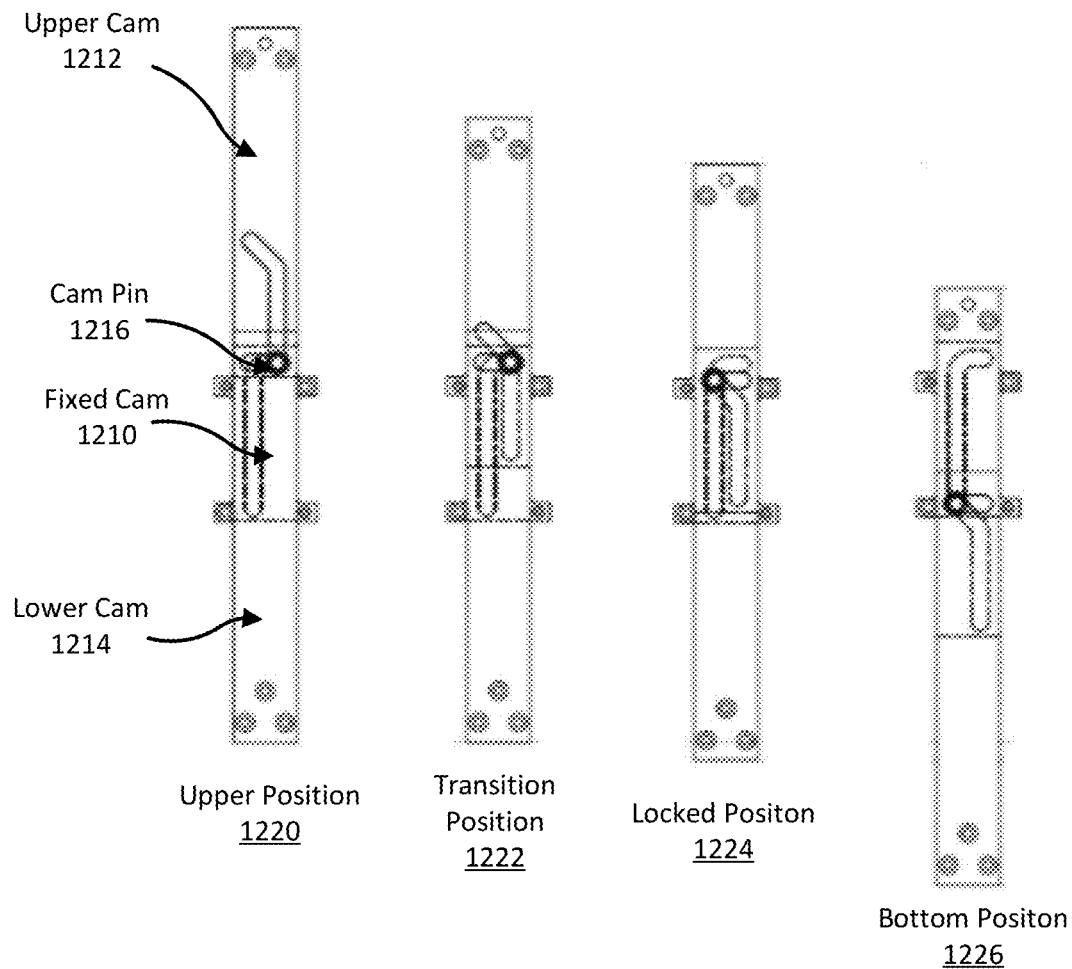

A cam system is coupled to the brewer 1100 and controls the movement of the upper 1102 and lower plungers 1104 when joining the upper 1112 and lower 1114 to form the brew chamber 1110 during the brewing process 1110. By virtue of other components being mechanically coupled to the upper 1102 and lower plungers 1104 (e.g., a breaker arm 814, a wiper slide 1020, etc.), the cam system 1200 can move any number of components during the brewing process 550. As the brew chamber motor 1116 actuates and the plunger gear boxes 1122 and 1124 and moves the plungers, the cam system 1200 moves through positions and changes the position of the brew chambers 1112 and 1114. The plungers 1102 and 1104 are raised and lowered based on the relative positions of the cams in the cam system FIGS. 12A-12D illustrates a cam systems 1200A for the brewer 1100. FIG. 12A is the cam system coupled, and FIG. 12B is the cam system 1200A decoupled into its constituent components. Here, the cam system 1200A includes a fixed cam 1210, an upper cam 1212, a lower cam 1214, and a cam pin 1214. Each cam has a cam path that allows the cam pin 1216 to move through the cam. The upper cam 1212 is coupled to the upper brew chamber 1112 and the lower cam 1214 is coupled to the lower brew chamber 1114. The upper cam 1212 is coupled to the lower cam 1214 using the fixed cam 1210 and cam pin 1216. As the upper cam 1212 is actuated downwards (or upwards) the cam pin 1216 travels through the cam paths 1218 to move the upper cam 1212 and then the lower cam 1214.

The cams system can travels through four distinct positions: the top position 1220A, the transition position 1222, the direct linked position 1224, and the bottom position 1226. When moving from the top position 1220 to the transition position 1222, the only movement is done by driving the upper cam 1212. The lower cam 1214 is locked in a fixed state to the fixed cam 1210. When moving from the transition position 1222 to the direct linked position 1224 the upper cam 1212 pushes the cam pin 1214 to the left and out of the locked state. When moving from the direct linked position 1224 to the bottom position 1226, the driving upper cam 1212 and the driven lower cam 1214 are directly connected and lower at the same rate.

Figures 12D, 12E:
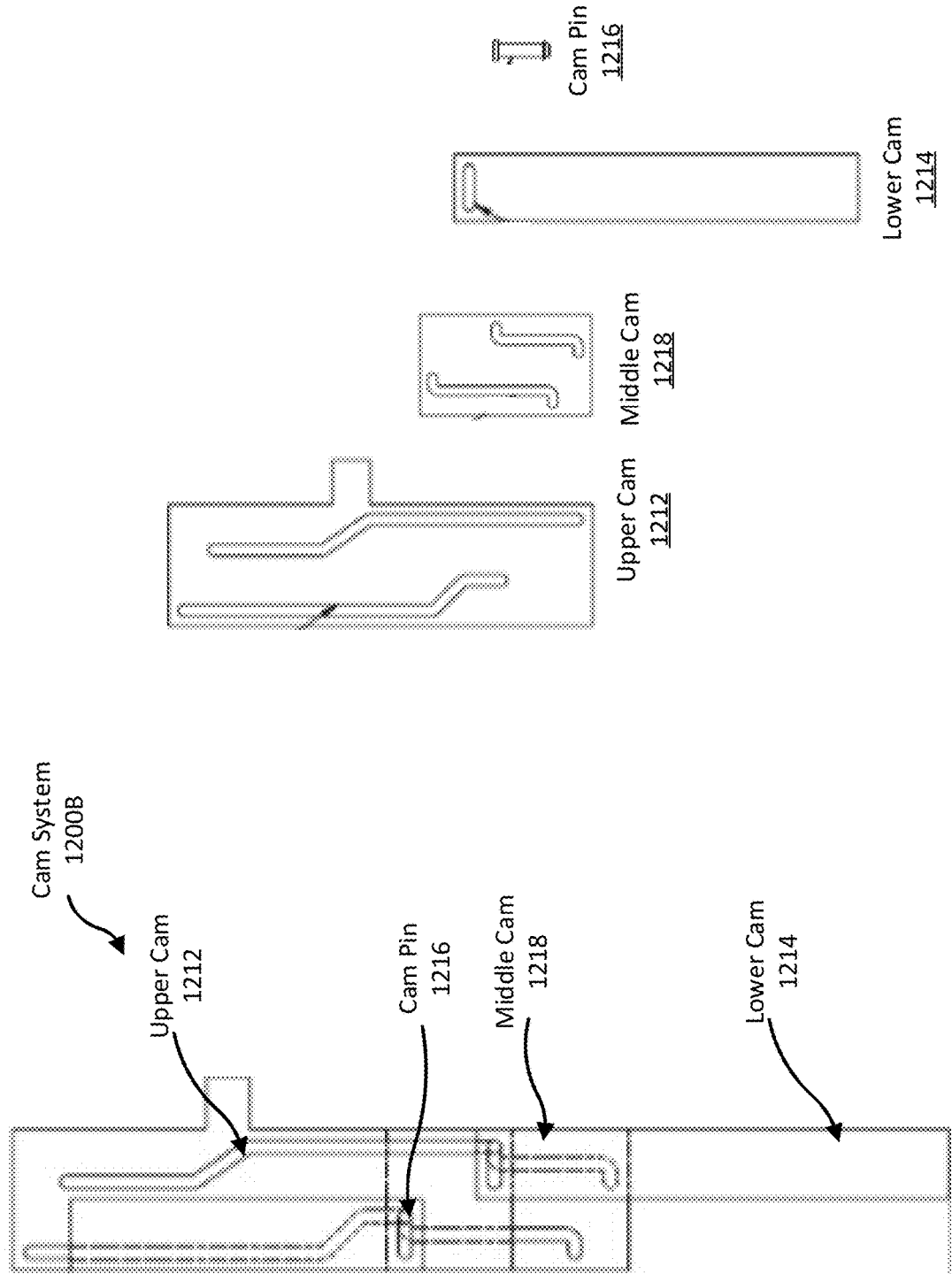
FIGS. 12D-12F illustrate a cam arm system of the brew chamber, according to one example embodiment.
Figure 12F:
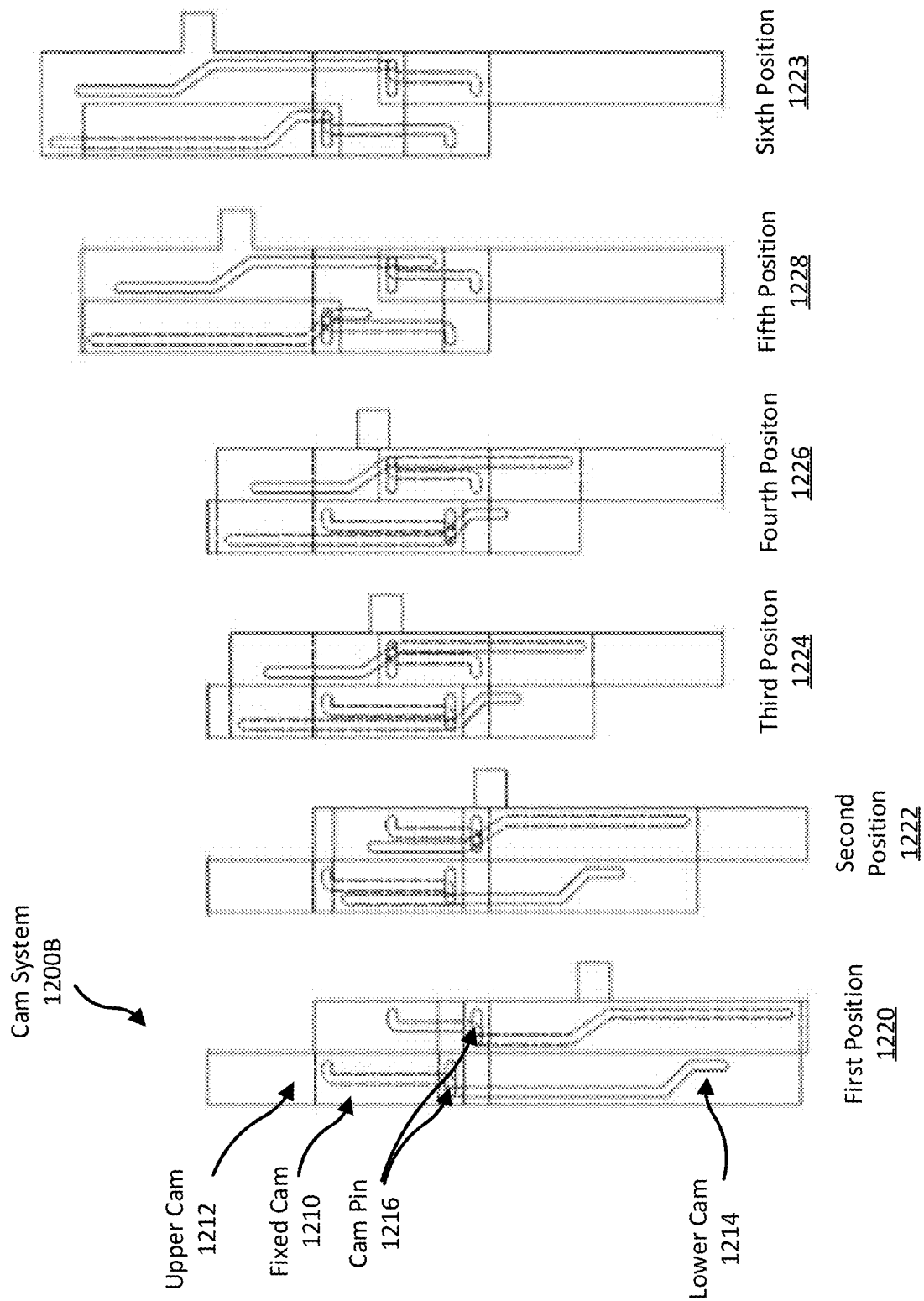

In various other embodiments, the cam system can include any number of cams with any number of positions. In some cases, the cam system can include cams with more than one path. For example, as illustrated in FIGS. 12D-12F, a cam system 1200B includes a middle cam 1210, an upper cam 1212, a lower cam 1214, and a cam pin 1214. However, here, the cam system 1220B has an upper cam 1212 and middle cam 1218 with two cam paths. Additional cam paths allow the cam system 122B to move through six different positions 1220-1230. Additional positions can allow the cam systems to move multiple components of the beverage system with more control. For example, in the first two positions, the cam system 1200B can move the wiper slider 1020 and upper brew chamber 1112, in the next two positions the cam system 1200B moves the upper brew chamber 1112 and the lower brew chamber 1114, and in the last two positions it can move the breaker arm 814.

V. Pod

Figure 13A:
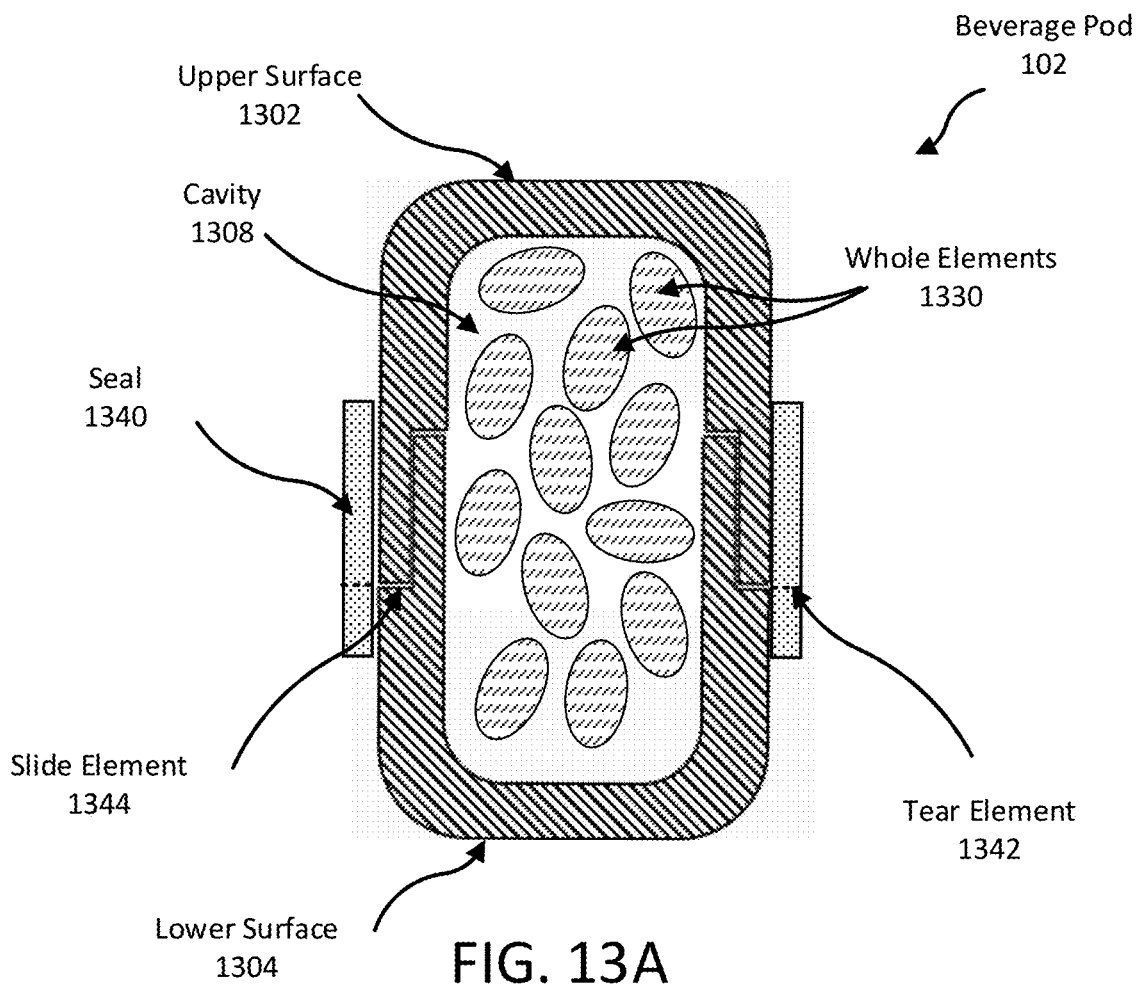
FIGS. 13A-13D illustrate a beverage pod with a failure mechanism, and a process for breaking the beverage pod, according to one example embodiment.

FIG. 13A is a cross-section illustration of a beverage pod 102 that is used in the beverage machine 100. In this embodiment, the beverage pod 102 is a hollow cylinder filled with whole elements 1330 that is used in the beverage machine 100 (e.g. coffee beans or tea leaves), but can be any other shape that can hold whole elements. Here, the pod 102 is includes an upper surface 1302 and a lower surface 1304. The upper surface 1302 and the lower surface 1304 are coupled with a sidewall 1306 such that the upper surface 1302, lower surface 1304, and sidewall 1306 form a cavity. The upper surface 1302 and the lower surface 1304 are approximately circular, but may vary in shape. For example, in some cases, the lower surface 1304 and upper surface 1302 may be square, oval, rectangular, etc. In some configurations, the upper surface 1302 and the lower surface 1304 may be shapes different from one another (e.g., a circular lower surface 1304 and a square upper surface 1302).

The sidewall 1306 connects an outer edge of the upper surface 1302 to an outer edge of the lower surface 1304 with a coupling seal (not illustrated). Here, because the upper surface 1302 and lower surface 1304 are approximately circular, the sidewall 1306 forms a cylinder, but can be any shape that connects the upper surface 1302 to the lower surface 1304 (e.g., a square cylinder, a pyramid, etc.). The sidewall coupling seal can be actuatable between a loaded state and an unloaded state. In the unloaded state the sidewall is decoupled from the upper (or lower) surface 1302 such that whole elements can be inserted into the beverage pod 102. In the loaded state the coupling seal mechanically couples the sidewall 1306 to the upper surface 1302.

Figure 13B:
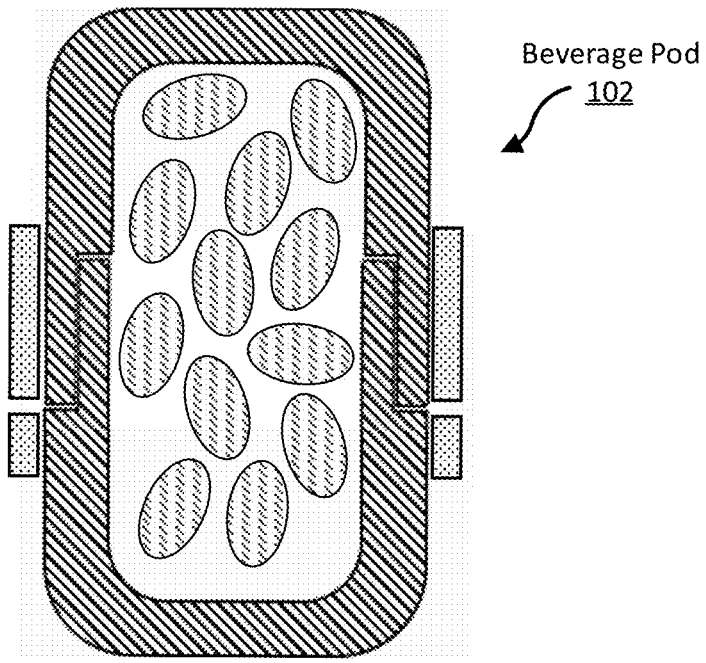
Figure 13C:
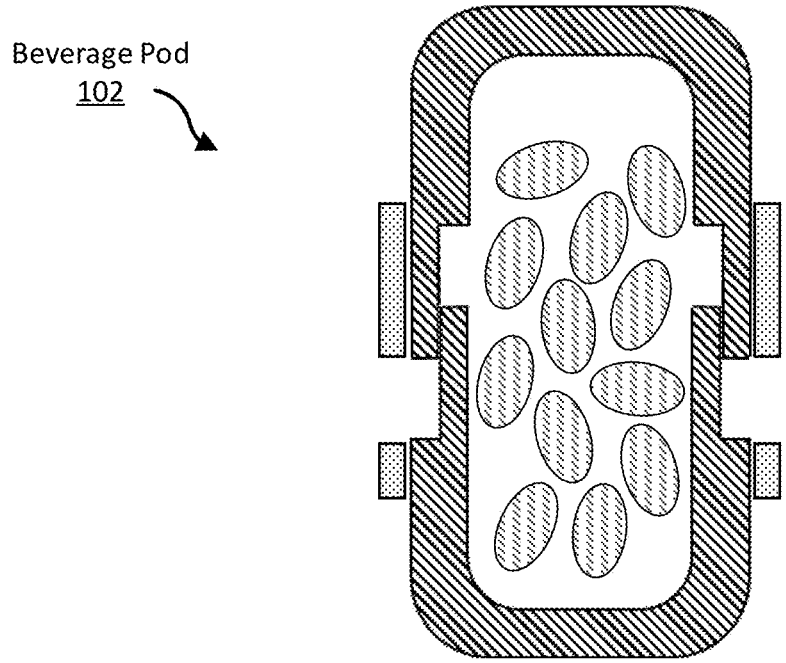
Figure 13D:
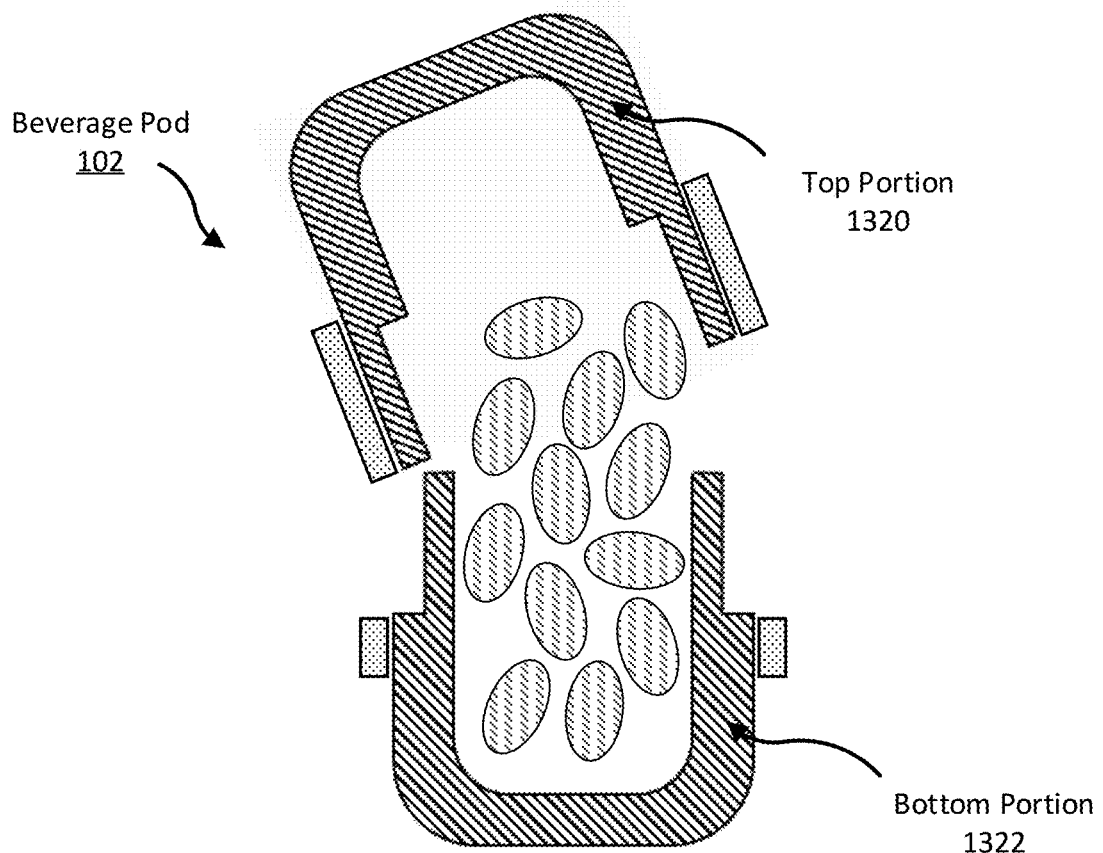

In some embodiments, the sidewall 1306 can be separated such that the beverage pod includes a top portion 1320 and a bottom portion 1322 (as shown in FIG. 13D). The top portion 1320 and bottom portion 1322, when mechanically coupled, form a cavity for the whole elements 1320. When the top portion 1320 and bottom portion 1322 are decoupled, whole elements 1330 can exit the beverage pod 102. In other configurations, the beverage pod 102 can include any number or type of portions (e.g., a front portion, a back portion, bottom third, etc.) such that a cavity 1308 is formed when the portions are mechanically coupled.

In some embodiments, the beverage pod 102 can include a seal 1340 on the outside of the beverage pod 102. The seal 1340 can include information about the whole elements internal to the beverage pod or a machine readable indicator. In other cases the machine readable indicator is not on the seal (e.g., on the top or lower surface 1304). The seal 1340 can also function to create a nearly air-tight environment for beverage pods 102 including failure elements. In addition, for beverage pods 102 including a top portion 1320 and a bottom portion 1322, the seal 1340 can assist in prevent the top portion 1320 from separating from the bottom portion 1322.

The beverage pod 102 includes at least one failure element that is engineered to fail when actuated by the breaker 800. In some embodiments, the beverage pod 102 can include more than one failure element. For example, in the illustrated embodiment, the pod includes two failure elements: a tear element 1342 and a slide element 1344. The tear element 1342 is an approximately circular partial perforation on the perimeter of the seal 1340 that can be torn when actuated by the breaker. The slide element 1344 includes two overlapping portions of the sidewall 1306 that are mechanically coupled. That is, a segment of the sidewall on the top portion has a lip with a proximal facing surface, and a segment of the sidewall on the bottom portion has a lip with a distal facing surface. When the proximal facing surface is mechanically coupled to the distal facing surface the sidewall is a single piece and the top portion is mechanically coupled to the bottom portion. The slide element 1344 is broken when the two overlapping surfaces are pulled apart by the breaker. The slide element 1344 is approximately circular and along a perimeter of the beverage pod 102. Additionally, the slide element 1344 approximately bisects the sidewall such that when the slide element is broken the top portion 1320 and bottom portion 1322 are about equal in size. When both of the failure elements have been broken, the beverage pod can be separated into the top portion 1320 and the bottom portion 1322.

Generally the beverage pod is actuatable between two states: a closed state and an open state. In the closed state, the whole elements 1330 are contained within the cavity 1308. In the open state, the whole elements 1330 can be released from the cavity 1308. The breaker 800 can function to actuate the beverage pod 102 between the closed state and open state by breaking the failure mechanisms and separating the pod into the top portion 1320 and the bottom portion 1322.

FIGS. 10A-10D are also a series of illustrations of a beverage pod 102 breaking into the top portion 1322 and bottom portion 1324 when actuated by the breaker 800.

In FIG. 13A, the beverage pod 102 begins in the closed state. Both the tear element 1342 and the slide element 1344 have not failed and the whole elements 1330 are contained within the cavity 1308.

In FIG. 13B, the breaker 800 (not pictured) begins to actuate the beverage pod 102 between the closed state and the open state. In this example, the tear element 1342 on the seal 1340 fails first.

In FIG. 13C, the breaker 800 continues to actuate the beverage pod 120 between the closed state and the open state. Now that the tear element 1342 has failed, the slide element 1344 can begin to fail and allow the top portion 1320 to be separated from the bottom portion 1322. In the illustrated example, the top portion 1320 has begun to slide off of the bottom portion 1322. That is, a lip of the top portion 1320 previously coupled to a lip of the bottom portion 1322 has begun to mechanically decouple.

In FIG. 13D, the breaker has actuated the beverage pod to the open state. Both the tear element 1342 and slide element 1344 have failed and the whole elements can exit the cavity. That is, the surfaces of the top portion 1320 and bottom portion 1322 that were previously coupled are now decoupled.

VI. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions, like the processes described in FIGS. 5-6, are presented in terms of algorithms and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system (e.g., system controller 400), or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium (e.g., internal storage 460), such as, but is not limited to, any type of disk including floppy disks, optical disks, CD ROMs, and magnetic optical disks, read only memories (ROMs), random access memories (RAMs), EPROMs, EEPROMs, magnetic or optical cards, or any type of media suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for detecting potential malware using behavioral scanning analysis through the disclosed principles herein. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for brewing a beverage with whole brewing elements included in a beverage pod using a beverage machine, the method comprising:
   receiving, at an input to the beverage machine, the beverage pod including the whole brewing elements, the beverage pod comprising a machine-readable code representing instructions for brewing the beverage with the whole brewing elements included in the beverage pod using the beverage machine;
   reading, using the beverage machine, the machine-readable code to determine the instructions for brewing the beverage;
   grinding, using a grinder of the beverage machine, the whole brewing elements into grounds according to the instructions, the whole brewing elements released to the grinder from the beverage pod;
   brewing, using the beverage machine, the grounds into the beverage according to the instructions, the brewing comprising:
      sealing a brew chamber for a brew time defined by the instructions, wherein:
         the brew chamber comprises an upper section and a lower section attached to a lower plunger, the upper section decouplable from the lower section, and
         the brew chamber is sealed by actuating the lower plunger to couple to the lower section to the upper section,
      filling the brew chamber with liquid according to the instructions to brew the beverage, and
      agitating liquid in the brew chamber according to the instructions while brewing the beverage; and
   dispensing the liquid from the brew chamber as the beverage.

2. The method of claim 1, further comprising:
   opening, using a breaker of the beverage machine, a surface of the beverage pod to release the whole brewing elements into the grinder of the beverage machine.

3. The method of claim 2, wherein opening the beverage pod comprises one or more of:
   puncturing the surface of the beverage pod,
   cutting the surface of the beverage pod,
   peeling the surface of the beverage pod off the beverage pod, and
   removing a portion of the pod itself.

4. The method of claim 1, further comprising:
   disposing of the grounds from the lower brew chamber by mechanically translating the grounds into a waste receptacle.

5. The method of claim 1, wherein filling the brew chamber with liquid according to the instructions further comprises:
   supplying, from a water inlet fluidically coupled to the brew chamber, liquid into the brew chamber while the upper section and lower section are sealed.

6. The method of claim 5, wherein supplying the liquid into the brew chamber further comprises:
   pressurizing a boiler such that liquid in the boiler is supplied to the brew chamber via the water inlet.

7. The method of claim 5, wherein the liquid is sourced from a device that changes a temperature of the liquid.

8. The method of claim 5, wherein the liquid is sourced from a device that stores the liquid.

9. The method of claim 1, wherein dispensing the liquid further comprises:
   supplying, from a pressure source gaseously coupled to the brew chamber, air from the pressure source into the brew chamber, the air forcing the beverage out of the beverage machine via a fluidic system.

10. The method of claim 1, wherein a gas is controllably pushed into the brew chamber during the brewing process.

11. The method of claim 1, wherein reading the machine-readable code to determine the instructions for brewing the beverage further comprises determining, using the machine-readable code, a unique identifier for the beverage to be created by brewing the whole brewing elements and accessing instructions to brew the beverage associated with the unique identifier.

12. The method of claim 1, wherein brewing the beverage further comprises:
   loading the grounds into the lower section; and
   actuating the lower section such that creates a liquid tight seal with the upper section.

13. The method of claim 1, wherein the beverage machine is configured to connect to a network and reading the machine-readable code to determine the instructions for brewing the beverage comprises accessing the instructions via the network.

14. The method of claim 1, wherein the beverage machine is configured to connect to a network and further comprising initializing the beverage machine, the initialization comprising connecting the beverage machine to a network device.

15. The method of claim 14, wherein the network device is a user device.

16. A beverage machine comprising:
   an input area configured for receiving a beverage pod including whole brewing elements, the beverage pod comprising a machine-readable code representing instructions for brewing a beverage with the whole brewing elements included in the beverage pod using the beverage machine;
   a reader configured to read the machine-readable code representing the instructions for brewing the beverage;
   a grinder configured to grind whole brewing elements into brewing material according to the instructions;
   a brew chamber configured to brew brewing material into a beverage according to the instructions, the brew chamber comprising:
      an upper section,
      a lower section coupled to a lower plunger, wherein:
         the upper section decouplable from the lower section, and
         the lower section and upper section are moveable with respect to one another by actuating the lower plunger, the lower plunger actuated such that upper and lower sections are coupled to create a liquid-tight seal for a brew time defined by the instructions while brewing the beverage;
   a fluidic system configured to:
      fill the brew chamber with liquid according to the instructions to brew the beverage,
      agitate liquid in the brew chamber with air according to the instructions, and
      dispense liquid from the brew chamber as the beverage.

17. The beverage machine of claim 16, wherein the lower plunger and the lower section are moveable with respect to each other between:
- a load state in which the lower section is decoupled from the upper section such that brewing material are loadable into the brew chamber from the grinder,
- an unload state in which the lower section is decoupled from the upper section such that brewing material are unloadable from the brew chamber, and
- a brew state in which the upper section is coupled to the lower section such that the upper section and lower section form the liquid-tight seal.

18. The beverage machine of claim 17, further comprising:
- a wiper apparatus configured to remove brewing material from the brew chamber when the wiper apparatus is actuated, the wiper apparatus removing the brewing material when the brew chamber is in the unload state.

19. The beverage machine of claim 18, wherein the wiper apparatus is coupled to a waste receptacle and further configured to move brewing material from the brew chamber into the waste receptacle when actuated, the wiper apparatus moving the brewing material from the brew chamber to the waste receptacle after the beverage is brewed in the brew chamber.

20. The beverage machine of claim 16, wherein the fluidic system further comprises a boiler chamber fluidically coupled to the brew chamber, and the boiler chamber is configured to heat liquid for brewing the beverage in the brew chamber.

21. The beverage machine of claim 20, further comprising:
- a pressure source coupled to the boiler chamber, the pressure source configured to increase pressure in the boiler chamber such that liquid in the boiler chamber is supplied to the brew chamber via the lower plunger.

22. The beverage machine of claim 16, further comprises:
- a pressure source gaseously coupled to the brew chamber, the pressure source configured to pump air into the brew chamber after the beverage is brewed such that the beverage is dispensed via the fluidic system.

* * * * *